United States Patent
Kazmi

(10) Patent No.: US 7,983,655 B2
(45) Date of Patent: Jul. 19, 2011

(54) CONDITIONAL CALL TREATMENT FOR PREPAID CALLS

(75) Inventor: Mustafa Anwar Kazmi, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1063 days.

(21) Appl. No.: 11/765,655

(22) Filed: Jun. 20, 2007

(65) Prior Publication Data

US 2008/0318545 A1    Dec. 25, 2008

(51) Int. Cl.
*H04M 11/00* (2006.01)

(52) U.S. Cl. .................. 455/406; 455/435.1; 455/435.2; 455/407; 455/414.1; 455/405; 379/121.01; 379/114.03; 379/114.21; 379/114.22

(58) Field of Classification Search .......... 455/405–407, 455/410–411, 415, 435.1–435.2; 379/114.03, 379/114.21–114.29, 115.01–115.02

See application file for complete search history.

(56) References Cited

U.S. PATENT DOCUMENTS

| | | |
|---|---|---|
| 5,123,111 A | 6/1992 | Delory et al. |
| 5,353,335 A | 10/1994 | D'Urso et al. |
| 5,355,406 A | 10/1994 | Chencinski et al. |
| 5,448,633 A | 9/1995 | Jamaleddin et al. |
| 5,488,650 A | 1/1996 | Greco et al. |
| 5,493,608 A | 2/1996 | O'Sullivan |
| 5,511,114 A | 4/1996 | Stimson et al. |
| 5,537,594 A | 7/1996 | Shannon et al. |
| 5,592,535 A | 1/1997 | Klotz |
| 5,722,067 A | 2/1998 | Fougnies et al. |
| 5,737,393 A | 4/1998 | Wolf |
| 5,737,701 A | 4/1998 | Rosenthal et al. |
| 5,771,276 A | 6/1998 | Wolf |
| 5,812,639 A | 9/1998 | Bartholomew et al. |
| 5,867,570 A | 2/1999 | Bargout et al. |
| 5,946,380 A | 8/1999 | Cohen et al. |
| 5,978,456 A | 11/1999 | Takeuchi et al. |
| 5,991,407 A | 11/1999 | Murto |
| 5,991,748 A | 11/1999 | Taskett |
| 5,995,822 A | 11/1999 | Smith et al. |
| 6,014,428 A | 1/2000 | Wolf |
| 6,018,652 A | 1/2000 | Frager et al. |
| 6,037,880 A | 3/2000 | Manion |

(Continued)

FOREIGN PATENT DOCUMENTS

EP    1030506 A2    8/2000

(Continued)

OTHER PUBLICATIONS

International Search Report and Written Opinion, mailed Feb. 9, 2009 for App. No. PCT/US2008/056385, 8 pages.

(Continued)

*Primary Examiner* — Wayne Cai
(74) *Attorney, Agent, or Firm* — Zagorin O'Brien Graham LLP

(57) ABSTRACT

A method and system for processing a prepaid call in a mobile telecommunications network is provided. A default call processing parameter for processing a call can control the processing of the call when communications between the Mobile Switching Center and the Service Control Point fails. The value of the default call processing parameter can be set to permit the call to continue or to be terminated in accordance with a characteristic associated with the call, such as a characteristic of the dialed telephone number or a nature of address in the case of an outgoing call or a location of the terminating mobile subscriber in the case of an incoming call.

13 Claims, 13 Drawing Sheets

U.S. PATENT DOCUMENTS

| | | | |
|---|---|---|---|
| 6,058,300 | A | 5/2000 | Hanson |
| 6,061,433 | A | 5/2000 | Polcyn et al. |
| 6,070,067 | A | 5/2000 | Nguyen et al. |
| 6,075,855 | A | 6/2000 | Christiansen et al. |
| 6,115,601 | A | 9/2000 | Ferreira |
| 6,122,510 | A | 9/2000 | Granberg |
| 6,144,847 | A | 11/2000 | Altschul et al. |
| 6,144,938 | A | 11/2000 | Surace et al. |
| 6,157,823 | A | 12/2000 | Fougnies et al. |
| 6,167,251 | A | 12/2000 | Segal et al. |
| 6,169,975 | B1 | 1/2001 | White et al. |
| 6,181,785 | B1 | 1/2001 | Adams et al. |
| 6,185,414 | B1 | 2/2001 | Brunner et al. |
| 6,185,545 | B1 | 2/2001 | Resnick et al. |
| 6,188,752 | B1 | 2/2001 | Lesley |
| 6,195,543 | B1 | 2/2001 | Granberg |
| 6,205,326 | B1 | 3/2001 | Tell et al. |
| 6,236,851 | B1 | 5/2001 | Fougnies et al. |
| 6,240,284 | B1 | 5/2001 | Bugnon et al. |
| 6,253,072 | B1 | 6/2001 | Verdonk |
| 6,256,504 | B1 | 7/2001 | Tell et al. |
| 6,327,363 | B1 | 12/2001 | Henderson et al. |
| 6,333,976 | B2 | 12/2001 | Lesley |
| 6,345,181 | B1 | 2/2002 | Janhonen et al. |
| 6,363,411 | B1 | 3/2002 | Dugan et al. |
| 6,373,930 | B1 | 4/2002 | McConnell et al. |
| 6,377,938 | B1 | 4/2002 | Block et al. |
| 6,393,269 | B1 | 5/2002 | Hartmaier et al. |
| 6,397,055 | B1 | 5/2002 | McHenry et al. |
| 6,404,869 | B1 | 6/2002 | Henderson et al. |
| 6,404,880 | B1 | 6/2002 | Stevens |
| 6,411,803 | B1 | 6/2002 | Malackowski et al. |
| 6,424,706 | B1 | 7/2002 | Katz et al. |
| 6,424,840 | B1 | 7/2002 | Fitch et al. |
| 6,434,126 | B1 | 8/2002 | Park |
| 6,463,130 | B1 | 10/2002 | Malik |
| 6,480,710 | B1 | 11/2002 | Laybourn et al. |
| 6,487,277 | B2 | 11/2002 | Beyda et al. |
| 6,487,401 | B2 | 11/2002 | Suryanarayana et al. |
| 6,490,450 | B1 | 12/2002 | Batni et al. |
| 6,493,547 | B1 | 12/2002 | Raith |
| 6,496,690 | B1 | 12/2002 | Cobo et al. |
| 6,496,691 | B1 | 12/2002 | Easley et al. |
| 6,507,644 | B1 | 1/2003 | Henderson et al. |
| 6,516,190 | B1 | 2/2003 | Linkola |
| 6,526,273 | B1 | 2/2003 | Link, II et al. |
| 6,542,601 | B1 | 4/2003 | Hernandez et al. |
| 6,567,657 | B1 | 5/2003 | Holly et al. |
| 6,594,484 | B1 | 7/2003 | Hitchings, Jr. |
| 6,625,268 | B1 | 9/2003 | Wallenius |
| 6,625,439 | B2 | 9/2003 | Laybourn et al. |
| 6,671,506 | B1 | 12/2003 | Lee |
| 6,671,523 | B1 | 12/2003 | Niepel et al. |
| 6,684,072 | B1 | 1/2004 | Anvekar et al. |
| 6,705,520 | B1 | 3/2004 | Pitroda et al. |
| 6,728,353 | B1 | 4/2004 | Espejo et al. |
| 6,741,687 | B1 | 5/2004 | Coppage |
| 6,748,066 | B1 | 6/2004 | Espejo et al. |
| 6,771,950 | B1 | 8/2004 | Shupe et al. |
| 6,904,035 | B2 | 6/2005 | Requena |
| 6,912,383 | B1 | 6/2005 | Li et al. |
| 6,934,529 | B2 | 8/2005 | Bagoren et al. |
| 6,950,876 | B2 | 9/2005 | Bright et al. |
| 6,957,058 | B2 | 10/2005 | Chan et al. |
| 6,975,852 | B1 | 12/2005 | Sofer et al. |
| 6,987,969 | B1 | 1/2006 | Brunig et al. |
| 7,050,811 | B2 | 5/2006 | Grech et al. |
| 7,088,987 | B1 | 8/2006 | Espejo et al. |
| 7,123,703 | B2 | 10/2006 | Hausmann et al. |
| 7,133,685 | B2 | 11/2006 | Hose et al. |
| 7,184,748 | B2 | 2/2007 | Espejo et al. |
| 7,209,890 | B1 | 4/2007 | Peon et al. |
| 7,215,942 | B1 | 5/2007 | McQuaide, Jr. et al. |
| 7,231,201 | B2 | 6/2007 | Espejo et al. |
| 7,280,645 | B1 | 10/2007 | Allen et al. |
| 7,330,110 | B1 | 2/2008 | Heintzman et al. |
| 7,356,328 | B1 | 4/2008 | Espejo et al. |
| 7,463,889 | B1 | 12/2008 | DiPrima et al. |
| 7,466,806 | B2 | 12/2008 | Espejo et al. |
| 7,480,710 | B1 | 1/2009 | Olson et al. |
| 7,529,538 | B2 | 5/2009 | Espejo et al. |
| 7,539,629 | B1 | 5/2009 | Peon et al. |
| 7,609,682 | B2 | 10/2009 | Ang et al. |
| 7,653,377 | B1 | 1/2010 | Espejo et al. |
| 7,706,792 | B1 | 4/2010 | DiPrima et al. |
| 7,787,860 | B2 | 8/2010 | Espejo et al. |
| 2001/0001321 | A1 | 5/2001 | Resnick et al. |
| 2001/0028705 | A1 | 10/2001 | Adams et al. |
| 2001/0049656 | A1 | 12/2001 | Halkosaari et al. |
| 2002/0029189 | A1 | 3/2002 | Titus et al. |
| 2002/0077829 | A1 | 6/2002 | Brennan et al. |
| 2002/0091572 | A1 | 7/2002 | Anderson et al. |
| 2002/0104090 | A1 | 8/2002 | Stettner |
| 2002/0107007 | A1 | 8/2002 | Gerson |
| 2002/0107738 | A1 | 8/2002 | Beach et al. |
| 2002/0115424 | A1 | 8/2002 | Bagoren et al. |
| 2002/0143634 | A1 | 10/2002 | Kumar et al. |
| 2002/0147658 | A1 | 10/2002 | Kwan |
| 2002/0156683 | A1 | 10/2002 | Stoutenburg et al. |
| 2002/0181710 | A1 | 12/2002 | Adam et al. |
| 2002/0193093 | A1 | 12/2002 | Henrikson et al. |
| 2002/0193100 | A1 | 12/2002 | Riffe et al. |
| 2003/0002635 | A1 | 1/2003 | Koch et al. |
| 2003/0026404 | A1 | 2/2003 | Joyce et al. |
| 2003/0037176 | A1 | 2/2003 | Dannehr et al. |
| 2003/0095566 | A1 | 5/2003 | Bunting et al. |
| 2003/0119477 | A1 | 6/2003 | Uppal et al. |
| 2003/0125042 | A1 | 7/2003 | Olrik et al. |
| 2003/0126020 | A1 | 7/2003 | Smith et al. |
| 2003/0143978 | A1 | 7/2003 | Cooper |
| 2003/0157925 | A1 | 8/2003 | Sorber et al. |
| 2003/0158960 | A1 | 8/2003 | Engberg |
| 2004/0063423 | A1 | 4/2004 | Kagay, Jr. |
| 2004/0097229 | A1 | 5/2004 | Muhonen et al. |
| 2004/0103191 | A1 | 5/2004 | Larsson |
| 2004/0132449 | A1 | 7/2004 | Kowarsch |
| 2004/0185828 | A1 | 9/2004 | Engelhart |
| 2004/0202187 | A1 | 10/2004 | Kelly et al. |
| 2004/0228457 | A1 | 11/2004 | Espejo et al. |
| 2005/0009499 | A1 | 1/2005 | Koster |
| 2005/0075106 | A1 | 4/2005 | Jiang |
| 2005/0101292 | A1 | 5/2005 | Fukui |
| 2005/0148319 | A1 | 7/2005 | Himeno |
| 2005/0164707 | A1 | 7/2005 | Batni et al. |
| 2005/0250493 | A1 | 11/2005 | Elkarat et al. |
| 2005/0250501 | A1* | 11/2005 | Mobin et al. .................. 455/445 |
| 2005/0262355 | A1 | 11/2005 | Banet et al. |
| 2006/0003736 | A1 | 1/2006 | Chan et al. |
| 2006/0003766 | A1 | 1/2006 | Parameswar et al. |
| 2006/0023856 | A1 | 2/2006 | Welton |
| 2006/0058010 | A1 | 3/2006 | Williams et al. |
| 2006/0058049 | A1 | 3/2006 | McLaughlin et al. |
| 2006/0073808 | A1 | 4/2006 | Buchert |
| 2006/0240820 | A1 | 10/2006 | Jiang |
| 2006/0240822 | A1 | 10/2006 | Jiang |
| 2007/0049247 | A1 | 3/2007 | Espejo et al. |
| 2007/0106569 | A1 | 5/2007 | McQuaide et al. |
| 2007/0205263 | A1 | 9/2007 | Peon et al. |
| 2007/0281687 | A1 | 12/2007 | Jiang |
| 2008/0014933 | A1 | 1/2008 | Montz et al. |
| 2008/0096525 | A1 | 4/2008 | Engelhart |
| 2008/0119162 | A1 | 5/2008 | Sivalingam et al. |
| 2008/0207181 | A1 | 8/2008 | Jiang |
| 2008/0261559 | A1 | 10/2008 | Cai et al. |
| 2008/0299967 | A1 | 12/2008 | Kazmi |
| 2009/0234747 | A1 | 9/2009 | Peon et al. |
| 2010/0105369 | A1 | 4/2010 | Diprima et al. |

FOREIGN PATENT DOCUMENTS

| | | |
|---|---|---|
| EP | 1039764 A1 | 9/2000 |
| EP | 1372089 | 12/2003 |
| WO | WO9216078 | 9/1992 |
| WO | 9821874 A1 | 5/1998 |
| WO | 9918713 A1 | 4/1999 |
| WO | 0019702 A2 | 4/2000 |
| WO | 0025507 A1 | 5/2000 |

OTHER PUBLICATIONS

Mouly, Michel and Pautet, Marie-Bernadette, "The GSM System," France, 1992, pp. 569-577.

Paulius Meskauskas, "Customised Applications for Mobile Enhanced Logic (CAMEL)," Research Seminar on Nomadic Computing, Department of Computer Science, University of Helsinki, 13 pages.

Zahid Ghadialy, "CAMEL: An Introduction," Jul. 25, 2004, printed from http://www.3g4g.co.uk/Tutorial/ZG/zg_camel.html, 11 pages.

David G. Smith, "An Introduction to GSM Enhancements for Operator Specific Services (CAMEL)," The Institute of Electrical Engineers, 1996, 9 pages.

U.S. Appl. No. 11/754,808, filed May 29, 2007, titled, "Optimized CAMEL Triggering for Prepaid Calling," naming inventor Mustafa Anwar Kazmi.

U.S. Appl. No. 11/781,459, filed Jul. 23, 2007, titled, "Dynamic Location-Based Rating for Prepaid Calls," naming inventor Charles Hamadi and Mustafa Anwar Kazmi.

U.S. Appl. No. 11/861,339, filed Sep. 26, 2007, titled, "Recovery of Lost Revenue in Prepaid Calls," naming inventor Mustafa Anwar Kazmi.

U.S. Appl. No. 11/846,277, filed Aug. 28, 2007, titled, "Decisionmaking for Dynamic Local Time Updates in a Prepaid Terminating Call," naming inventor Mustafa Anwar Kazmi.

U.S. Appl. No. 11/846,259, filed Aug. 28, 2007, titled, "Peak Off-Peak Rating for Prepaid Terminating Calls," naming inventor Mustafa Anwar Kazmi.

U.S. Appl. No. 11/846,299, filed Aug. 28, 2007, titled, "Determining Capability to Provide Dynamic Local Time Updates in a Prepaid Terminating Call," naming inventor Mustafa Anwar Kazmi.

3GPP TS 02.78 v7.2.0 (Dec. 2001) Technical Specification, "3rd Generation Partnership Project; Technical Specification Group Services and System Aspects; (CAMEL); Service definition—State 1 (Release 1998),"GSM® Global System for Mobile Communications, 34 pages.

Crowe, David, "Thirsty for new features? Get a CAMEL?", Cellular Networking Perspectives, David Crowe's Wireless Review Magazine Articles Protocols Section: Mar. 2001, 5 pages, retrieved Nov. 17, 2004 from URL: http://www.cnp-wireless.com/ArticleArchive/Wireless%20Review/200103%20CAMEL.html.

ITU-T Recommendation Q.762, "Signalling System No. 7—ISDN User Part general functions of messages and signals," International Telecommunications Union, Dec. 1999, 30 pages, URL: <https://staff.hti.bfh.ch/mdm1/Kursunterlagen/SS7/T-REC-Q.762.pdf>.

ITU-T Recommendation Q.763, "Signalling System No. 7—ISDN User Part formats and codes," International Telecommunications Union, Dec. 1999, 134 pages, URL: <https://staff.hti.bfh.ch/mdm1/Kursunterlagen/SS7/T-REC-Q.763.pdf>.

Kislak, Ali, "'CAMEL,' 'Customised Applications for Mobile network Enhanced Logic,'" CAMEL & IN, Demo Version 1.0, Jan. 19, 2002, 18 pages, retrieved Nov. 17, 2004 from URL: http://www.hotel-fiesta.com/4g-aliweb/MyDOCS/CAMELMExEin/CAMELin.htm.

3rd Generation Partnership Project; Technical Specification Group Core Network; Customised Applications for Mobile network Enhanced Logic (CAMEL) Phase 4; CAMEL Application Part (CAP) specification (Release 5), 3GPP TS 29.078 5.0.0 (Jun. 2002), 222 pages.

Cloward, William H., "Sophisticated, High Speech Capacity Voice Response Application for End Users," Official Proceedings of Speech Tech '86, Media Dimensions, Inc., Apr. 30, 1986, pp. 58-61.

Joe Gadget, Purchase Coca Cola Using Your Cellphone in Japan, http://http://www.techfresh.net/gadgets/misc-gadgets/purchase-coca-cola-using-cellphone-in-japan/, Sep. 29, 2006, 5 pages.

Levy, Ira D., "Keeping the bells ringing: Account replenishment in near real time," TMA Journal, Mar./Apr. 1999, v19n2, p. 24-26.

Moshavi, Sharon, "Please Deposit No Cents," Forbes, Aug. 16, 1993, 1 page.

* cited by examiner

CONDITIONAL CALL TREATMENT FOR PREPAID CALLS

FIELD OF ART

Aspects described herein relate to use of CAMEL triggers in a mobile communications system to provide an efficient method and system for default call processing based on characteristics of the call, including a dialed number in the case of an outgoing call or location of the called party in the case of an incoming call.

BACKGROUND

The use of mobile communications devices has become commonplace in today's society. As consumers of mobile communications services become more sophisticated, it becomes more important for service providers to offer more and better services in order to fully meet their subscribers' needs. Such value-added services have become an integral part of the consumer's expectations regarding their mobile communications service.

Many of these value-added services relate to the provision of Intelligent Network (IN) services such as video or music download services, automated call forwarding services, ringback tone services, prepaid services and the like. In the Global System for Mobile Communications (GSM), the Customized Application of Mobile Enhanced Logic (CAMEL) standard has been developed to aid GSM operators to offer operator-specific services to their subscribers, even if a subscriber is roaming outside their home network. These services can include call processing functions such as caller ID and call screening, call forwarding, call rerouting; charging functions such as location-based charging or personal discounts; and provision of tones and announcements to provide information regarding a call to a subscriber's mobile telephone. CAMEL protocol is defined in a set of standards established by the ETSI (European Telecommunication Standardization Institute) and later upgraded as part of 3GPP (Third Generation Partnership Project) initiative. These standards can be found at http://webapp.etsi.org/key/queryform.asp.

Information regarding CAMEL networks can be found in many publications. The most comprehensive work on CAMEL including the latest standardization enhancements can be found in the book entitled, *CAMEL, Intelligent Network for the GSM, GPRS and UMTS Networks* by Rogier Noldus, published by John, Wiley & Sons Limited (2006). Other publications that describe the architecture and operation of a mobile network using CAMEL functionality include the publication by Paulius Meskauskas entitled "Customised Applications for Mobile Enhanced Logic (CAMEL)," for the Research Seminar on Nomadic Computing for the Department of Computer Science at the University of Helsinki; the CAMEL tutorial by Zahid Ghadialy entitled "CAMEL: An Introduction," (Jul. 25, 2004), available on the World Wide Web at http://www.3g4g.co.uk/Tutorial/ZG/zg_camel.html; and "An Introduction to GSM Enhancements for Operator Specific Services (CAMEL)" (1996) by David G. Smith, published by the IEEE, Savoy Place, London. Information regarding CAMEL triggers and trigger detection points may also be found in U.S. patent documents such as, for example, U.S. Pat. No. 7,050,811 to Grech et al. and U.S. Patent Application Publication No. 2003/0095566 to Bunting et al.

Information regarding CAMEL networks may also be found in U.S. patent application Ser. No. 11/754,808, entitled "Optimized Camel Triggering for Prepaid Calling," filed May 29, 2007 by the same inventor hereof, which is hereby expressly incorporated by reference herein in its entirety.

In accordance with the basic structure for a CAMEL network, information about a mobile subscriber is contained in a database in the subscriber's Home Location Register (HLR). This information includes the identity of the mobile station, subscriber information including a subscriber profile, presence information, call forwarding options, subscription to enhanced services such as packet data and the like. The HLR may also maintain CAMEL Subscription Information (CSI) for a mobile subscriber in a CAMEL network, and such a subscriber having CSI will be referred to herein as a "CAMEL subscriber." When a CAMEL subscriber performs a location update to a different MSC in a GSM network, her subscription information is transferred and maintained in the Visitor Location Register (VLR) for that MSC. In a GSM network, the VLR is a logical entity which is often co-located with the Mobile Switching Center (MSC). When a mobile subscriber having CAMEL services in her home network roams to another network, the CAMEL Subscription Information about that roaming subscriber is temporarily stored in the VLR for that network so that the enhanced services that the subscriber has in her home network are also available to her as she roams. This helps to make a consumer's mobile service truly mobile, since she will experience the same level of service as a "visitor" in another network as she does in her own home network.

CAMEL works to enable the provision of such "seamless" mobile service by providing a protocol, known as the CAMEL Application Part (CAP) for communication between a Mobile Switching Center (MSC) and a Service Control Point (SCP) handling a mobile call, where the SCP is most often a part of the subscriber's home network. CAMEL also provides a Basic Call State Model (BCSM), which describes the different phases of call processing in the MSC. An Originating Basic Call State Model (O-BCSM) describes the call processing for a mobile-originated (MO) call, i.e., a call where the calling party is originating a call from her mobile device, whether the called device is a mobile or non-mobile device. Similarly, a Terminating Basic Call State Model (T-BCSM) describes the call processing to route a terminating call when the mobile device is the recipient of an incoming call.

Both the O-BCSM and T-BCSM contain various points, or states, in the call processing between the MSC and the SCP. Each state is preceded by a transition step, or Detection Point (DP) where the call is handed over to the SCP for a determination whether the call can proceed to the next state. A DP in a CAMEL call can either be an Event Detection Point (EDP) or a Trigger Detection Point (TDP). An EDP is imposed by the SCP during processing of the call, and detects significant events during the call, such as an answer from the called party or disconnection by the calling or called party. A TDP is a part of the processing for all CAMEL calls by a subscriber in a network, and forms a part of a subscriber's CAMEL Subscription Information in the HLR. Both an EDP and TDP can be described as being "armed" if they have been activated and are available for use in processing the call.

One of the services provided in a CAMEL network is prepaid mobile service, both for mobile originators and mobile recipients of calls in the mobile system. Prepaid mobile service is a popular option for many users. It can enable a user to enjoy the benefits of mobile communications without having to enter into a long-term contract. It also can be useful to facilitate management of mobile service, for example, as a parental control tool to manage a child's use of mobile services or as a management tool for corporate usage.

Control of a prepaid or other call in a CAMEL network can be managed by the SCP and the MSC through the use of messages passed between the SCP and the MSC by means of CAP operations. Charging for a prepaid call in a CAMEL network is handled by the SCP based in part on messages from the MSC. CAMEL also provides for processing of a call if the messaging between the MSC and the SCP fails. Failure of the CAP messaging, also known as CAP Dialogue, can result from the loss of signaling path between the MSC and SCP or due to maintenance activity or other error in the SCP. Processing of the call when the CAP messaging fails is decided by a parameter known in the art as "default call handling" that is part of the subscriber's CSI. The default call handling parameter can have one of two values—Release or Continue. If the parameter is set to "Release," the call will be terminated if the CAP messaging between MSC and SCP fails. If the default call handling parameter is set to "Continue," the call will be allowed to continue.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

Aspects described herein relate to a method and system for processing a call in a CAMEL network if messaging between the MSC and the SCP fails and the SCP loses control of the call. A method and system is provided for determining whether the call should "continue" or "release," i.e., be terminated, if messaging between the MSC and the SCP fails. According to one or more aspects described herein, a default call handling parameter can be defined to provide default instructions for call processing of an outgoing and an incoming call. According to aspects herein, a default call handling parameter for an outgoing call can be set to continue or release depending on characteristics of the call such as the nature of the number dialed or a nature of address associated with the outgoing call. According to other aspects herein, a default call handling parameter for an incoming call can be set to continue or release depending on the characteristics of the call, such as location of the terminating subscriber. These parameters and their values can be made part of a subscriber's CAMEL Subscription Information which is stored in the subscriber's HLR. This information can be downloaded to the MSC and can control call processing, for example, if the MSC loses contact with the SCP.

DETAILED DESCRIPTION

The aspects summarized above can be embodied in various forms. The following description shows, by way of illustration, combinations and configurations in which the aspects can be practiced. It is understood that the described aspects and/or embodiments are merely examples. It is also understood that other aspects and/or embodiments can be utilized, and that structural and functional modifications can be made, without departing from the scope of the present disclosure. In addition, although the aspects herein are described in the context of a particular Basic Call State Model using particular nomenclature for the steps and operations therein, it should be noted that variations in call state configurations and protocols may be used to process prepaid mobile calls in a CAMEL network and that such variations in configuration and protocol are within the scope of the present disclosure.

For example, some aspects herein relating to call processing are described in the context of establishment of a value of a default call processing parameter based on the characteristics of the call such as the telephone number dialed for an outgoing call or the location of the subscriber for an incoming call. It should be noted, however, that the criteria for setting a value of a default call processing parameter used in the description below, such as type of call, identification of number, or subscriber location, are merely exemplary, and that other criteria can be used to set a value of the default call processing parameter. It should also be noted that any criteria can be used to establish a category of outgoing telephone number or mobile subscriber location that can trigger a particular type of default call processing. It should further be noted that the identification of the telephone numbers or locations that can trigger a particular type of call processing or the call processing associated with a particular number can be changed as circumstances warrant. In addition, although aspects herein are described in the context of processing a prepaid call in a mobile network using CAMEL processing, it should be noted that the establishment of a default rule for call processing in the case where communication between control points fails can be utilized in other telecommunications systems using a plurality of control points to control processing of calls in the network.

Figure 1:
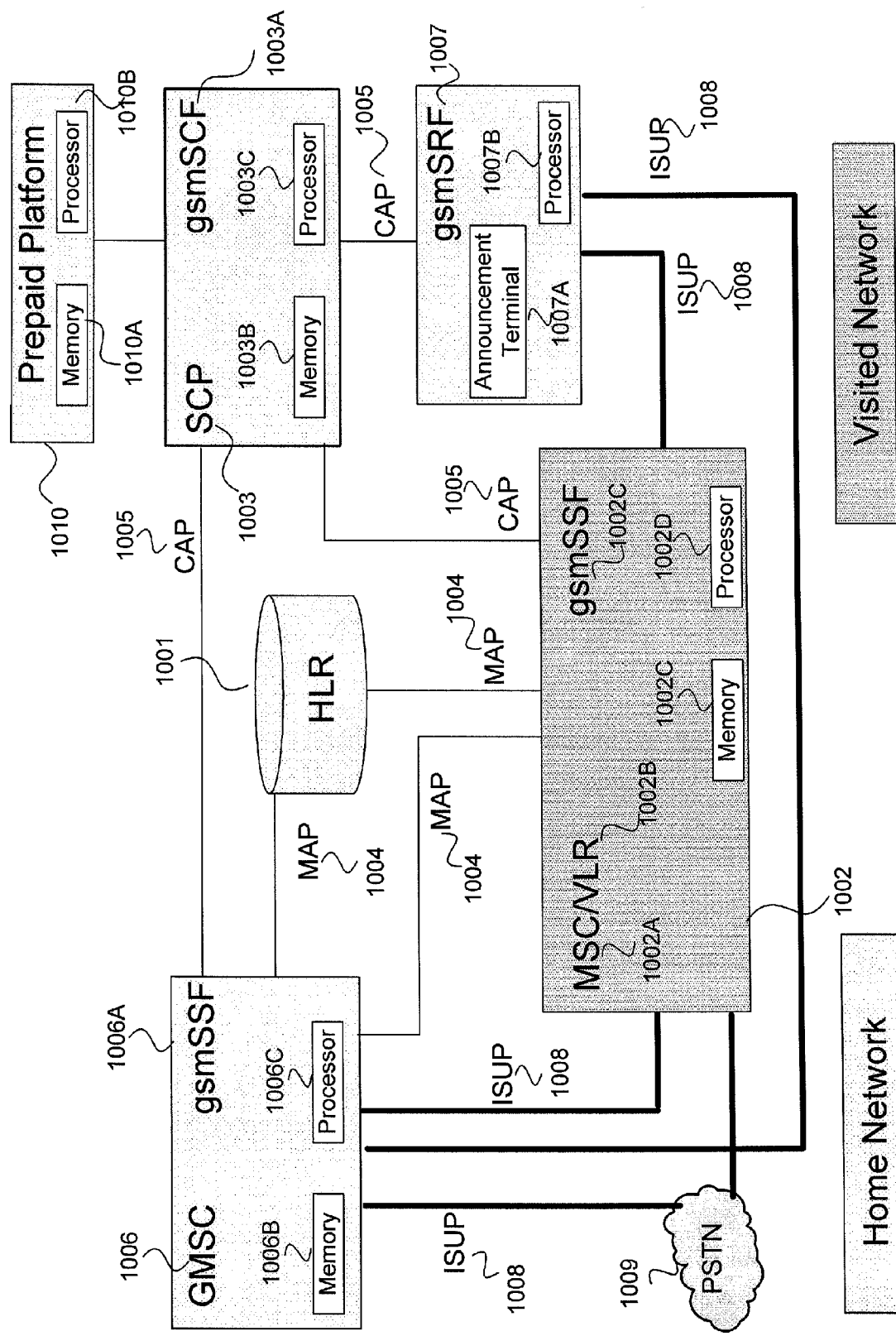
FIG. 1 is a block diagram depicting network elements in a CAMEL network.

FIG. 1 depicts exemplary network elements that can be utilized in a CAMEL network in accordance with one or more aspects herein. Signaling for call set up and call tear-down between network elements shown in FIG. 1 can be accomplished using ISDN User Part (ISUP) 1008, which is a part of the Signaling System #7 (SS7) communications protocol for signaling originating and terminating switching locations of telephone calls in a Public Switched Telephone Network (PSTN) 1009.

As shown in the configuration depicted in FIG. 1, a CAMEL network can include a Home Location Register (HLR) 1001, which can hold the CAMEL Subscription Information (CSI) for each subscriber in the CAMEL network. The CSI for a subscriber can include subscription information regarding call processing and call feature enhancements. The set of information provisioned in the HLR for the control of a mobile originating call is known as O-CSI. This includes the set of TDP that can intercept the processing of an originating call and also includes a set of parameters to control the actions at each of those TDPs. In a similar manner, the set of information provisioned in the HLR for the control of a terminating call to a mobile subscriber as recipient of the call is known as "T-CSI." The T-CSI for a terminating mobile subscriber can include the set of TDPs that can intercept the processing of a terminating call towards that subscriber and a set of parameters to control the actions at each of those TDPs.

The exemplary CAMEL network shown in FIG. 1 also can include a Mobile Switching Center/Visiting Location Register (MSC/VLR) 1002. The MSC/VLR 1002 can include a Mobile Switching Center (MSC) 1002A, memory 1002C, and processor 1002D that can receive and process a mobile subscriber's request to make a call, and a database of roaming mobile subscribers within the MSC's service area, which can be known as a Visiting Location Register (VLR) 1002B. When a mobile subscriber enters an area served by MSC 1002A, the subscriber's location can be updated in the HLR to point to VLR 1002B. During such an update, VLR 1002B also can be updated via Mobile Application Part (MAP) 1004 to include the subscriber's Originating CAMEL Subscription Information (O-CSI) from HLR 1001. MSC 1002A can then use the visiting mobile subscriber's O-CSI to govern processing of an outgoing mobile call originated by the subscriber. The exemplary CAMEL network shown in FIG. 1 can also include Service Control Point (SCP) 1003, which can include a memory 1003A and a processor 1003B. In accordance with aspects herein, the address for the SCP in a subscriber's home network can be part of the subscriber's O-CSI obtained during an update of the VLR. During outgoing call setup for a mobile subscriber, MSC/VLR 1002 can contact SCP 1003 using GSM Service Switching Function (gsmSSF) 1002C by way of CAMEL Application Part (CAP) protocol 1005, to inform SCP 1003 that the caller is a CAMEL subscriber and that the call should be processed by Service Control Function gsmSCF 1003A.

The exemplary CAMEL network shown in FIG. 1 also depicts network elements that can be used to process an incoming (terminating) call to a CAMEL mobile subscriber. When a call is made to a mobile user in the network, the call can be received by a Gateway Mobile Switching Center 1006, which also includes GSM Service Switching Function (gsmSSF) 1006A, memory 1006B, and processor 1006C. As shown in FIG. 1, when an incoming call directed to a mobile subscriber in a CAMEL network is received, GMSC 1006 can fetch the Terminating CAMEL Subscription Information (T-CSI) from that mobile subscriber's HLR 1001 via Mobile Application Part (MAP) 1004. Once the T-CSI is received from the HLR 1001, in a similar manner as for an outgoing call, GMSC 1006 can contact Service Control Point (SCP) 1003 using gsmSSF 1006A within GMSC 1006 by way of CAMEL Application Part (CAP) protocol 1005 to inform the SCP that the caller is a CAMEL subscriber and that the call should be processed by Service Control Function gsmSCF 1003A.

Among the functions performed by SCP 1003 is managing and calculating charges incurred by a prepaid subscriber for outgoing and incoming calls. SCP 1003 can obtain information regarding a prepaid mobile subscriber from Prepaid Platform 1010. According to aspects herein, memory 1010A in Prepaid Platform 1010 can contain information regarding a prepaid mobile subscriber's prepaid account, for example, account balance, call charging history, and special rate information, if any. Processor 1010B in Prepaid Platform 1010 can calculate a prepaid subscriber's account balance and available funds, determine whether a prepaid subscriber has sufficient funds or is otherwise eligible to complete an outgoing or incoming call, and communicate this information to SCP 1003 for use in controlling the prepaid call.

FIG. 1 also depicts Specialized Resource Function gsmSRF 1007, which may contain an Announcement Terminal 1007A, as an element of a CAMEL network. The SCP 103 can instruct the MSC/VLR or GMSC via CAMEL Operation: Establish Temporary Connection to set up a speech path to gsmSRF 1007. The gsmSRF, in turn, can contact SCP 1003 via CAP 1005 and can receive messages from SCP 1003 via CAP 1005 which can enable gsmSRF 1007 to play one or more messages to a caller by means of Announcement Terminal 1007A. For example, if processor 1010B in Prepaid Platform 1010 determines that a subscriber's prepaid account balance has fallen below a predetermined limit, Prepaid Platform 1010 can instruct SCP 1003 to cause Announcement Device 1007A to play a message informing the caller that the balance in the subscriber's prepaid account is insufficient to permit the call to be completed.

A subscriber's HLR in a CAMEL network can be "armed" with various CAMEL Trigger Detection Points (TDPs). These TDPs can be predefined in a CAMEL network and can form part of the subscriber's CAMEL subscription profile in the HLR. In a CAMEL network, a detection point (DP) can be described as being "armed" if it has been activated and is available for use in processing the call.

Each TDP is attached to several parameters, such as Service Key, SCP Address, the CAMEL version, etc. Each TDP also is attached to a parameter known as "Default Call Handling." The Default Call Handling parameter attached to a TDP can control the handling of a call if the communication established as a result of that TDP between the MSC and the SCP, also known as CAMEL Dialogue, fails, and its value can determine the actions to be taken by the MCP in such a case. For example, the Default Call Handling can be set to "release" so that every time there is a problem in the CAMEL dialogue between the MSC and the SCP, the call will be released, i.e., terminated. Alternatively, the Default Call Handling can be set to "continue," so that the call can continue even if messaging between the MSC and the SCP is interrupted. In a conventional CAMEL network, the Default Call Handling parameter for each TDP can be set to "release" or "continue" as part of a subscriber's CAMEL Subscription Information. For example, the "Default Call Handling" parameter can be set to "continue" for originating TDP "Collected Information" (also known as DP2) but be set to "release" for terminating TDP "Termination Attempt Authorized" (also known as TDP12) so that if communication between MSC and SCP fails, an originating call will continue, but a terminating prepaid call will be released.

Figure 2A:
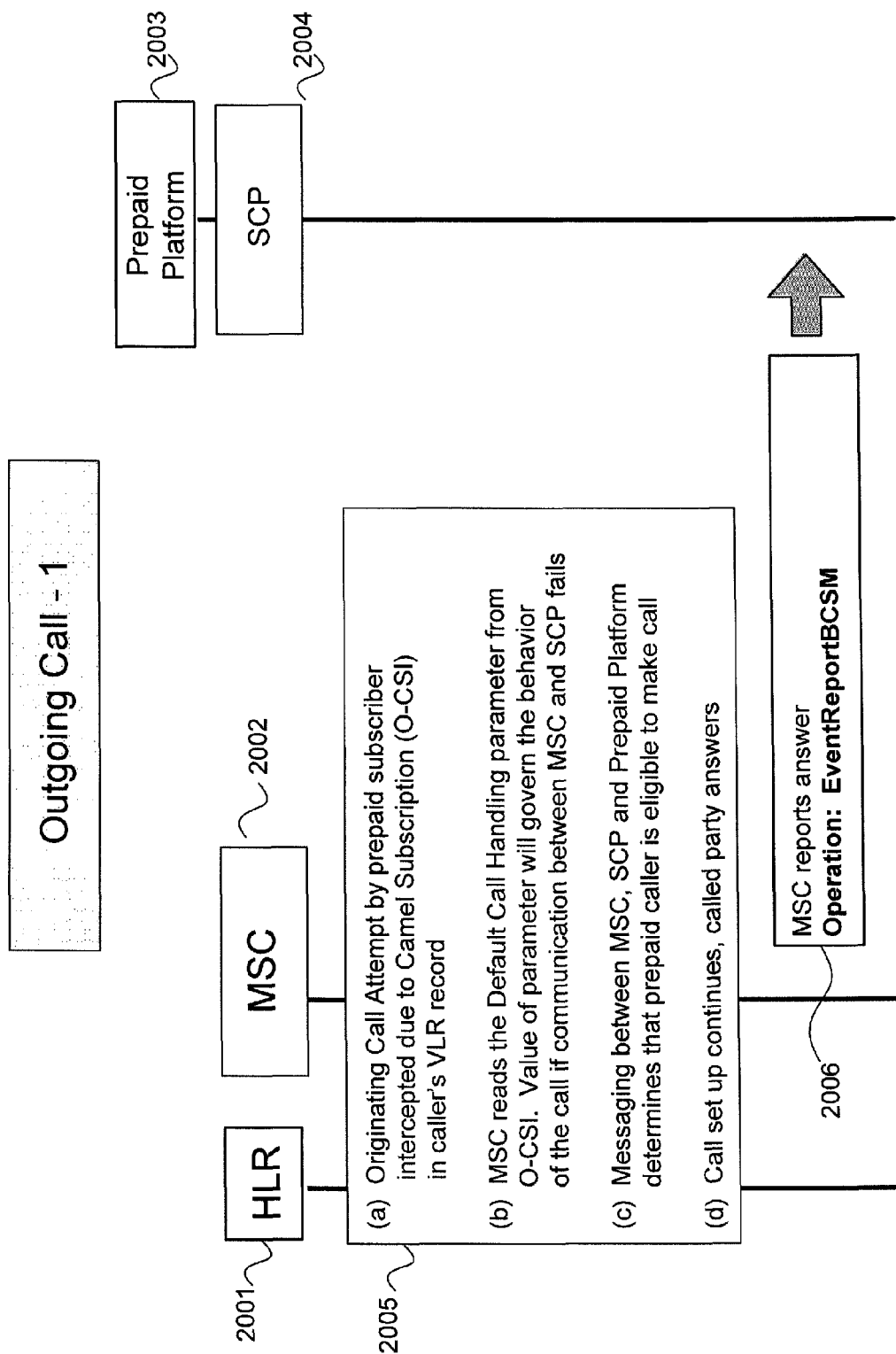
FIGS. 2A-2C depict a call flow in a CAMEL Originating Basic Call State Model in a mobile network in accordance with conventional methods.
Figure 2B:
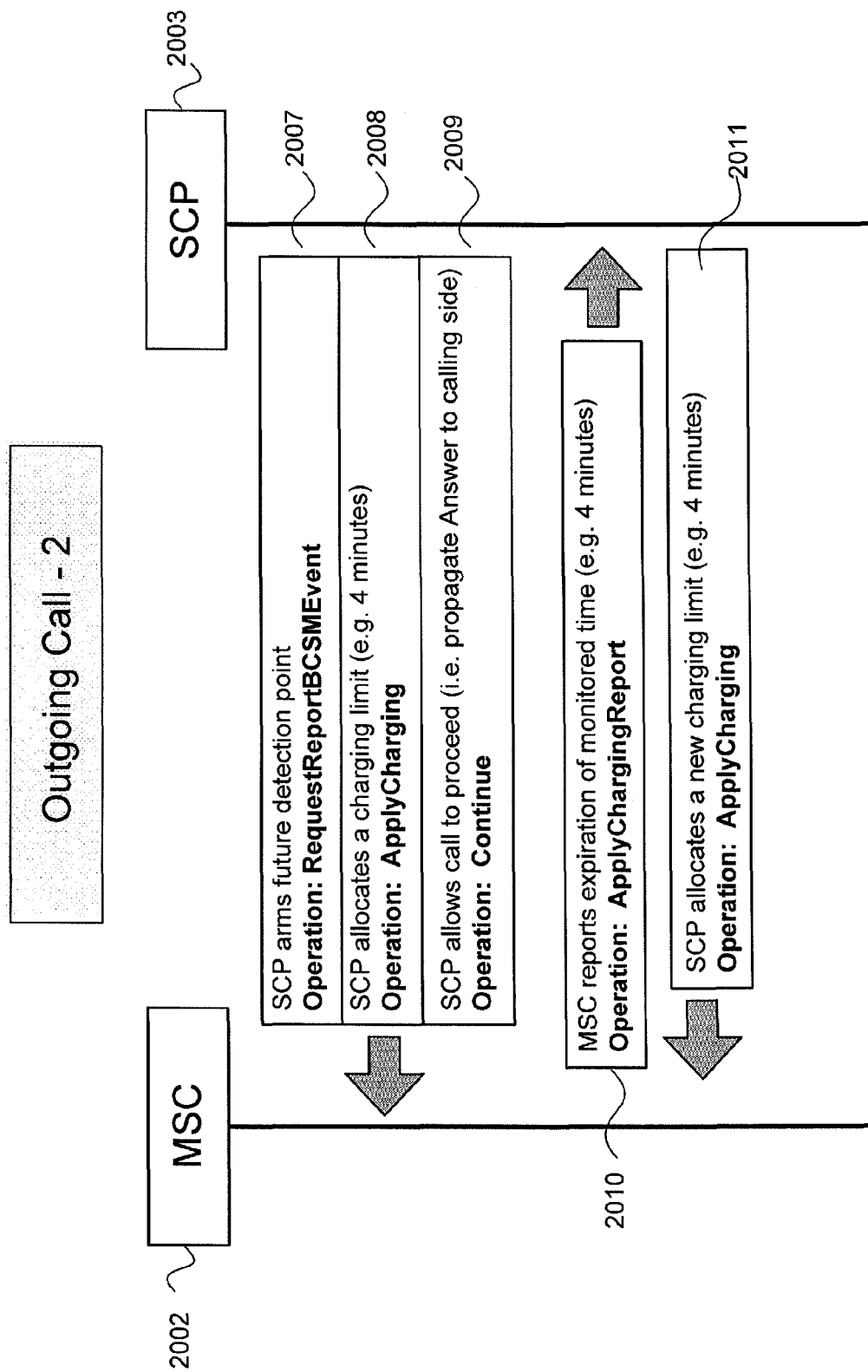
Figure 2C:
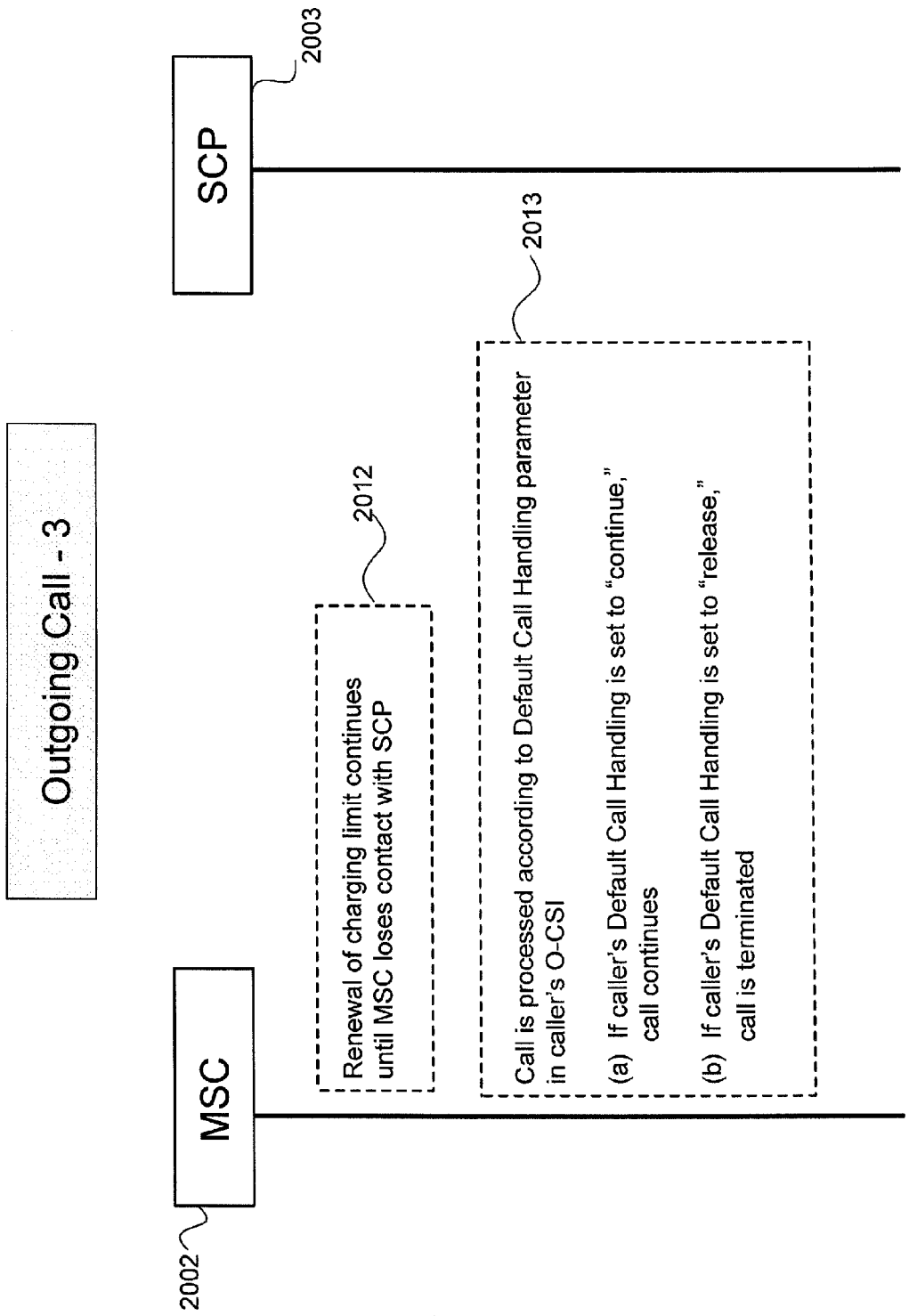

FIGS. 2A-2C depict an exemplary call flow for an originating prepaid call in a CAMEL network according to conventional methods in the case where communication between the MSC and the SCP fails. As shown in FIGS. 2A-2C, the call processing involves information flow between HLR 2001, MSC 2002, Prepaid Platform 2003, and SCP 2004.

As shown in FIG. 2A, at step 2005(a) a prepaid subscriber's outgoing (originating) call is intercepted due to the presence of Originating CAMEL Subscription Information (O-CSI) in the subscriber's record in the VLR. At step 2005 (b), the MSC reads the value of the "Default Call Handling" parameter from the subscriber's O-CSI so that MSC 2002 can control the call according the value of the "Default Call Handling" parameter if communications between MSC 2002 and SCP 2004 fails. At step 2005(c), messaging between MSC 2002 and SCP 2004 and between SCP 2004 and Prepaid Platform 2003 determines that the prepaid subscriber is eligible to complete the prepaid outgoing call, for example, because the subscriber has sufficient funds in her prepaid account or otherwise. At step 2005(d), call set up is allowed to continue, the called party answers, and at step 2006, MSC 2002 reports to SCP 2004 via Operation: EventReportBCSM that the call has been answered.

FIG. 2B depicts additional call processing in accordance with conventional methods after the prepaid call has been answered. As shown in FIG. 2B, after the call has been answered, at steps 2007 through 2009, SCP 2004 sends several instructions to MSC 2002 regarding charging and monitoring of the call. At step 2007, SCP 2004 arms one or more future detection points in the call, for example, an Event Detection Point (EDP) for call disconnect, by sending Operation: RequestReportBCSMEvent to MSC 2002. To ensure that a prepaid subscriber making an outgoing call does not exceed her prepaid account balance or otherwise become ineligible to continue the call, messaging between MSC 2002 and SCP 2004 control call flow in segments so that the prepaid subscriber's eligibility to continue the call can be monitored. At step 2008 via Operation: Apply Charging SCP 2004 allocates a charging limit time period, for example, 4 minutes, to the prepaid call, advises MSC 2002 of this charging limit time period, and instructs MSC 2002 to monitor for its expiration. At step 2009, SCP 2004 allows the call to proceed by instructing MSC 2002 via Operation: Continue to propagate the answer to the calling party side. After the expiration of the initial charging limit time period, that is, after the expiration of 4 minutes in the present example, at step 2010 MSC 2002 reports to SCP 2004 via Operation: ApplyChargingReport that the monitored time has expired. If the caller's prepaid account balance is sufficiently high to cover an additional period or the prepaid subscriber is otherwise eligible to continue the call, at step 2011, SCP 2004 allocates a new charging limit, again, for example, 4 minutes, and via a second iteration of Operation: ApplyCharging advises MSC 2002 of this new charging limit period.

As seen in FIG. 2C, in step 2012, the monitoring and renewal of charging limits seen in steps 2008, 2010, and 2011 of FIG. 2B continues until MSC 2002 loses contact with SCP 2004. It should be noted that the communication between MSC 2002 and SCP 2004 can be lost at any time, even before the first allocated charging limit time period has expired. When loss of communication between MSC 2002 and SCP 2004 occurs, the call will be processed according to the Default Call Handling parameter in the TDPs for the originating call. Thus, as seen in step 2013(a), if the caller's Default Call Handling parameter is set to "continue," the call continues even though SCP 2004 is no longer controlling the allocation of time periods for the call. Alternatively, if the caller's Default Call Handling parameter is set to "release," the call is released, i.e., terminated. In either case, the Prepaid Platform charges for the call through the last charging limit time period that was completed.

Figure 3A:
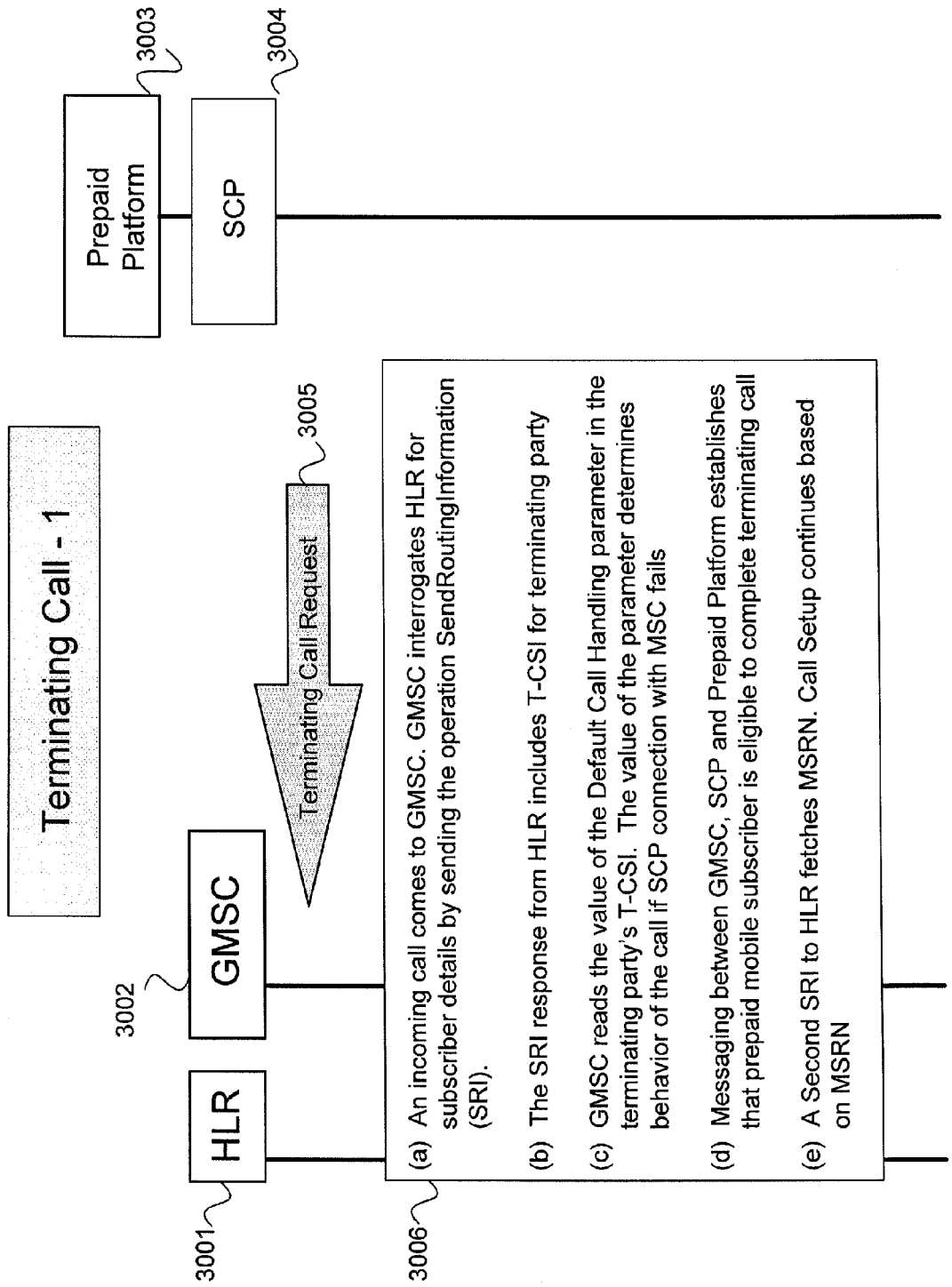
FIGS. 3A-3C depict a call flow in a CAMEL Terminating Basic Call State Model in a mobile network in accordance with conventional methods.
Figure 3B:
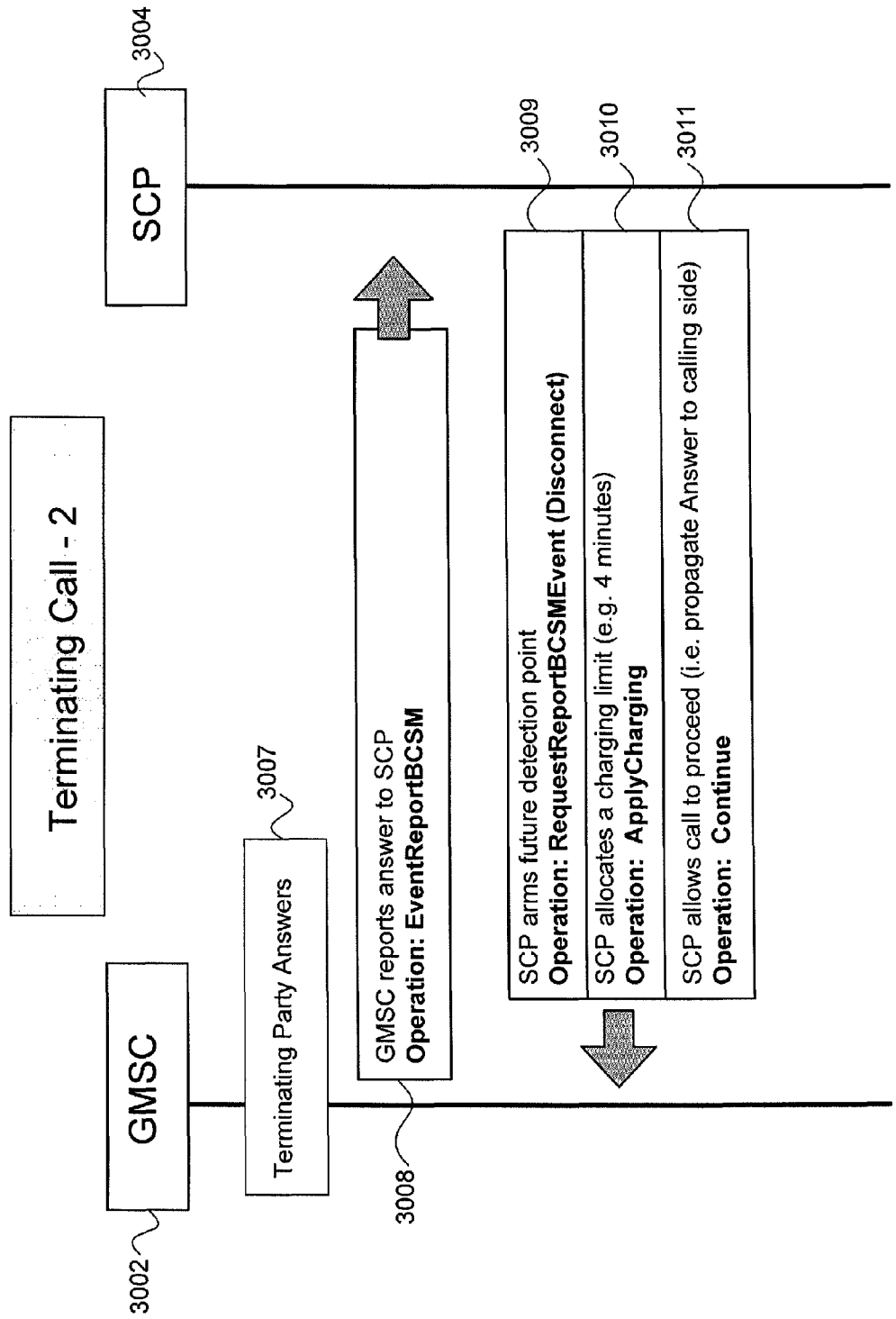
Figure 3C:
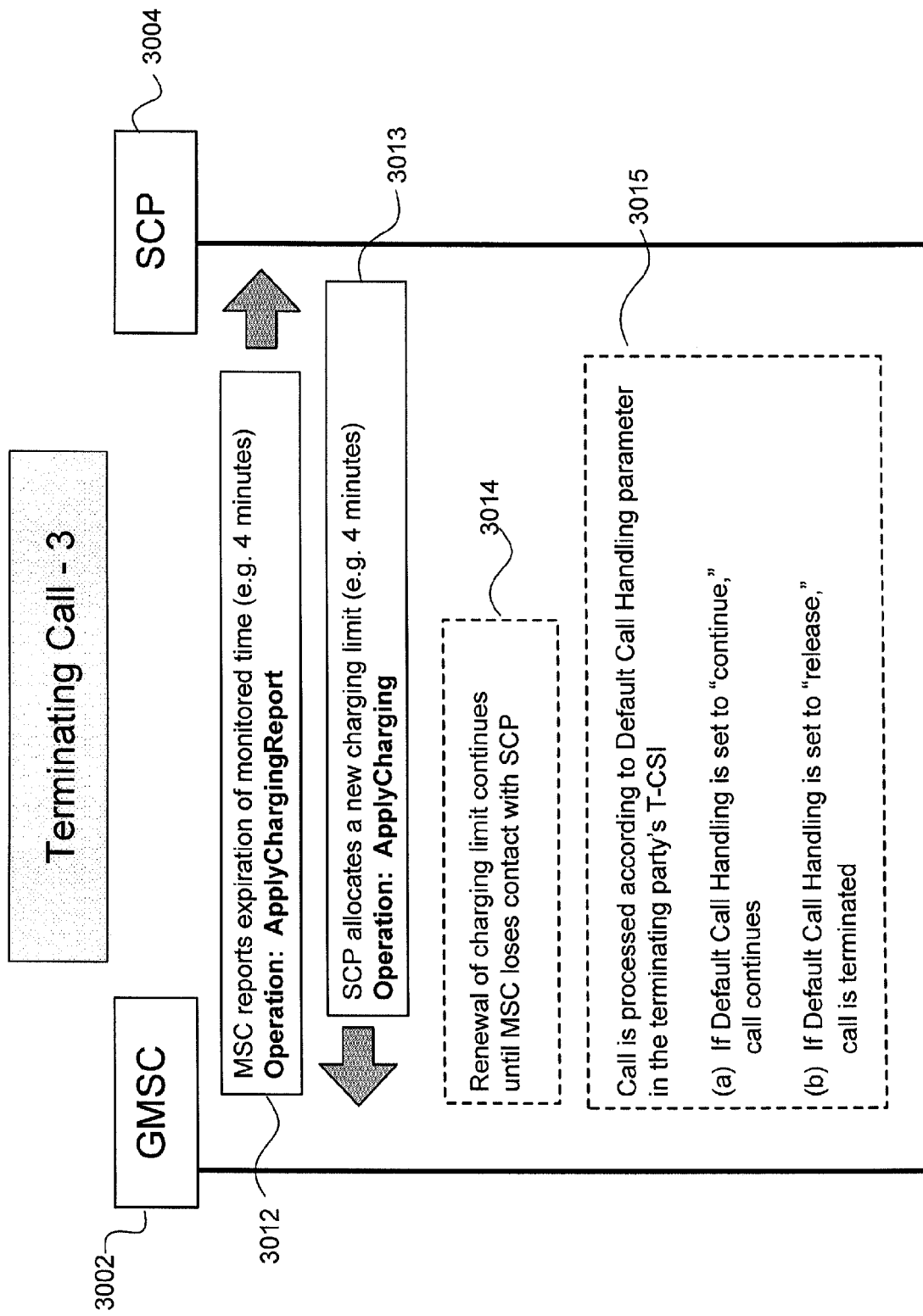

FIGS. 3A-3C depict a similar call processing flow using conventional methods for a call in which the prepaid subscriber in a CAMEL network is the recipient, or "terminating party" of a call. Such a call, also known as a "terminating call," is processed by messages sent between HLR 3001, GMSC 3002, Prepaid Platform 3003, and SCP 3004.

As shown in FIG. 3A, a Terminating Call Request 3005, which is an incoming call to a prepaid mobile subscriber in a CAMEL network, is directed to GMSC 3002. At step 3006(a), GMSC 3002 interrogates the HLR to obtain information necessary to set up the incoming call, such as her location, by sending the operation Send Routing Information. At step 3006(b), GMSC 3002 receives the response of the Send Routing Information (SRI) request from HLR 3001, which includes the subscriber's Terminating CAMEL Subscription Information (T-CSI) for use in controlling call set-up and processing of the incoming call. This T-CSI contains information regarding TDPs for controlling processing in the call. Each of these TDPs includes a Default Call Handling parameter. At step 3006(c), GMSC 3002 reads the value of the Default Call Handling parameter in the terminating party's T-CSI to obtain instructions for how the call should be processed if communications between GMSC 3002 and SCP 3004 fails. At step 3006(d), messaging between GMSC 3002, SCP 3004, and Prepaid Platform 3003 determines that the prepaid mobile subscriber is eligible to complete the terminating call because her prepaid account balance is sufficiently high or because she is otherwise eligible, and at step 3006(e), GMSC 3002 sends a second SRI request to HLR 3001 and fetches a temporary routable number known as Mobile Station Routing Number (MSRN) so that GMSC 3002 can route the call to the recipient.

In FIGS. 3B and 3C, additional call processing steps are shown. At step 3007, the terminating party answers the incoming call, and at step 3008, GMSC 3002 reports that the call has been answered to SCP 3004 via Operation: EventReportBCSM. At step 3009, SCP 3004 arms future EDPs for further call processing by sending Operation: RequestReportBCSMEvent to GMSC 3002. Also, in a manner similar to that for an outgoing call, to ensure that the prepaid subscriber does not exceed her prepaid account balance or otherwise become ineligible to continue the call, at step 3010, via Operation: Apply Charging SCP 3004 allocates a charging limit time period for the call, for example, 4 minutes, advises GMSC 3002 of this charging limit time period, and instructs GMSC 3002 to monitor for its expiration. At step 3011, SCP 3004 allows the call to proceed by instructing GMSC 3002, via Operation: Continue, to propagate the answer to the calling party side.

As seen in step 3012 in FIG. 3C, GMSC 3002 monitors the time used in the call, and when the monitored time limit, in this case, 4 minutes, expires, GMSC 3002 reports the expiration of the monitored time to SCP 3004 via Operation: ApplyChargingReport. SCP 3004 then rechecks the called party's prepaid account balance and if it remains sufficient to allow the call to continue or the prepaid subscriber is otherwise eligible to continue the call, at step 3013, SCP 3004 allocates a new charging limit, for example, an additional 4 minutes, to the call and via Operation: ApplyCharging instructs GMSC 3002 to monitor for the expiration of this additional time period. At step 3014, the monitoring and renewal of charging limits seen in steps 3010, 3012, and 3013 continues until GMSC 3002 loses contact with SCP 3004. As with the case of an outgoing call, it should be noted that communication between GMSC 3002 and SCP 3004 can be lost at any time, even before the first allocated time, 4 minutes in this example, has expired. Once communication between GMSC 3002 and SCP 3004 is lost, the call is processed according to the Default Call Handling parameter for the terminating call's TDP in the terminating party's T-CSI. Thus, as seen in step 3015(a), if the Default Call Handling parameter in the TDP is set to "continue," the call continues even though SCP 3004 is no longer controlling the allocated time periods for the call. Alternatively, if the terminating party's Default Call Handling parameter is set to "release," the call is released, i.e., terminated. In either case, the Prepaid Platform charges for the call through the last charging period that was completed.

According to conventional methods as described above, the Default Call Handling parameter in a TDP for either an originating call or a terminating call will control call processing for all calls when messaging between the MSC/GMSC and the SCP fails, irrespective of any factors that make continuation or termination of the call desirable. For example, if the Default Call Handling parameter is set to "release" for all calls, this can lead to customer dissatisfaction when calls are terminated before they are ended by the parties without regard for whether the prepaid subscriber has a high prepaid balance that could cover the cost of the call or any other factors that might make continuation of the call desirable. On the other hand, if the Default Call Handling parameter is set to "continue," the prepaid subscriber can continue the call even if the subscriber's prepaid account balance is not sufficient to cover the call. In either case, the subscriber can initiate or receive a new call regardless of how the previous call was processed.

According to one or more aspects described in more detail below, there is provided a method and system to apply "continue" or "release" default call handling for a subscriber's outgoing call based on factors such as the nature (e.g. domestic, international) or content (e.g. customer service, directory assistance) of the dialed number and to apply "continue" or "release" default handling for a subscriber's terminating call based on factors such as whether she is in her operator's network or roaming outside the operator's network.

In a method and system according to aspects described herein, a Default Call Handling parameter in a TDP that can instruct the MSC/GMSC regarding processing of the call when messaging between the MSC/GMSC and SCP fails can be set to have different values depending on the contents or characteristics of the call such as characteristics of a dialed telephone number or location of a subscriber. For example, in countries such as the United States and Canada, a dialed number beginning with the numbers "011" is an international call; in other countries an international call may begin with the sequence "00," which is also known as "international dialing prefix" in effect in a country. International calls can involve high charges for each minute of the call. Such expensive international calls can also exist even if the dialed number does not begin with "011" of "00." For example, calls to Canada can begin with the number "416" without the need for "011" but still can be more expensive than a domestic call. In some cases, the network can identify a number as international even if it does not begin with the international dialing prefix, for example, when a mobile subscriber puts a "+" (plus sign) in front of the dialed international number. This is accomplished by using a parameter called "Nature of Address" associated with the called party number. Typical values of "Nature of Address" can be "national," "international" etc. Other such high-charge calls can include numbers beginning with "900," which frequently involve high per-minute charges. Even domestic long-distance calls can be more expensive than a local call. Charging for such calls is controlled by the SCP in conjunction with the Prepaid Platform, and if messaging between the MSC and the SCP fails, charging for such calls is interrupted. Thus, to prevent a prepaid subscriber from continuing such a high-cost call when the SCP cannot charge the prepaid subscriber, it can be desirable to set the Default Call Handling parameter for such calls to "release" so that when messaging between the MSC/GMSC and the SCP fails, expensive unchargeable usage can be prevented.

Alternatively, the dialed number may be one for which charges will be minimal. For example, a dialed number may indicate that the call is a local call which is charged to the prepaid subscriber at a low rate. Alternatively, a call may be a toll-free number such as a "1-800" number for which the prepaid subscriber pays little or nothing. In such a case, failure of the SCP to be able to charge for the call poses little financial risk to the mobile service provider, and thus it can be desirable to set the Default Call Handling parameter for such calls to "continue" so that even when messaging between the MSC/GMSC and the SCP fails, the call can continue without any inconvenience to the subscriber.

In addition, an incoming call to a prepaid subscriber can be either a low- or a high-charge call. For example, an incoming call to a prepaid subscriber while she is within her home network may be charged at a very low rate, and permitting such a call to "continue" may be desirable. In contrast, an incoming call to a prepaid subscriber while she is roaming in another network may be subject to much higher charges, and should be "released" to avoid the subscriber incurring significant uncollectible charges.

Thus, according to one or more aspects, a Default Call Handling parameter in a TDP can be given different values to determine whether a call by or to a prepaid subscriber can continue if the MSC/GMSC loses contact with the SCP. The characteristics of this Default Call Handling parameter can be retrieved along with the TDPs in a subscriber's CAMEL profile from the HLR. The profile that controls originating call, known as O-CSI described earlier is sent to the VLR during location update and remains in effect until a new location update takes place or until HLR sends new set of subscriber data. The profile that controls terminating calls, known as T-CSI described earlier is sent to the GMSC during a terminating call set up and remains in effect for the duration of that call. This default call handling information can be used by the MSC or GMSC processing an outgoing or incoming call, respectively, for a prepaid mobile subscriber, to determine whether the call can continue or should be released based on a characteristic of the call, for example, the content or nature of the outgoing number, or any other desired characteristic. In addition, in accordance with one or more aspects, it can be possible to have more than one value of a Default Call Handling parameter which can instruct the MSC/GMSC to process calls in different ways depending on the nature of the call. For example, a Default Call Handling parameter in a TDP for outgoing calls, for example, DP2, "Collected Information," can be set to trigger a call "release" for outgoing calls having certain parameters and "continue" for outgoing calls having different parameters. For each of the originating TDPs, HLR can also identify a "default value" of the default call handling parameter so that when an outgoing call does not match any of the list of criteria for which "default call handling" is defined, the MSC can apply the "default value" (for example continue or release) for the default call handling parameter. At the same time, a Default Call Handling parameter in a TDP for incoming calls, for example, DP12, "Termination Attempt Authorized," can be set to "continue" or "release" a terminating call depending on, for example, a location of the terminating subscriber irrespective of the characteristics of the originating number. Similarly, for each of the terminating TDPs, the HLR can identify a "default value" of the default call handling parameter so that when an incoming call does not match any of the list of criteria for which "default call handling" is defined, the GMSC can apply the "default value" (for example continue or release) for the default call handling parameter.

Figure 4A:
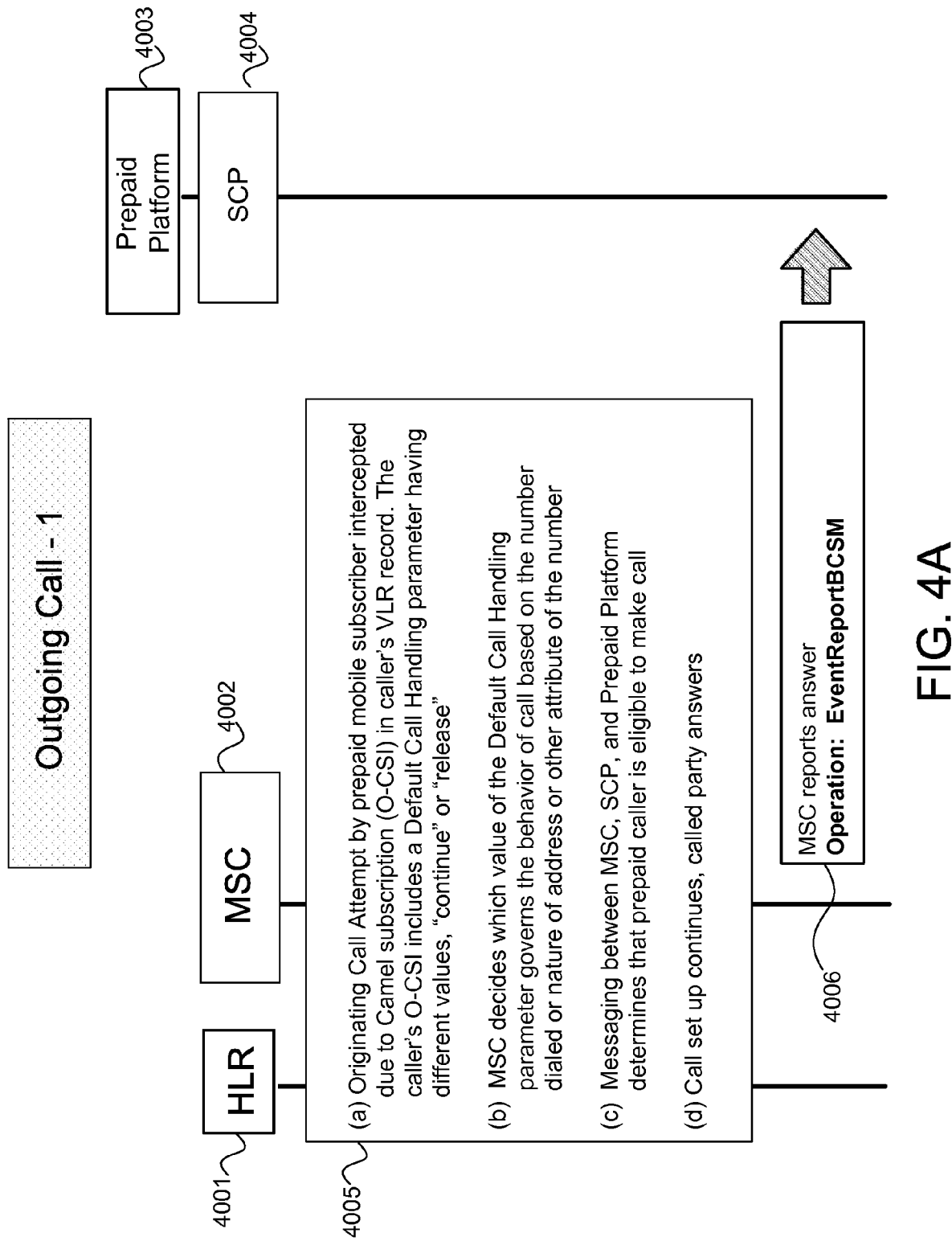
FIGS. 4A-4C depict a call flow in a CAMEL Originating Basic Call State Model in a mobile network according to one or more aspects described herein.
Figure 4B:
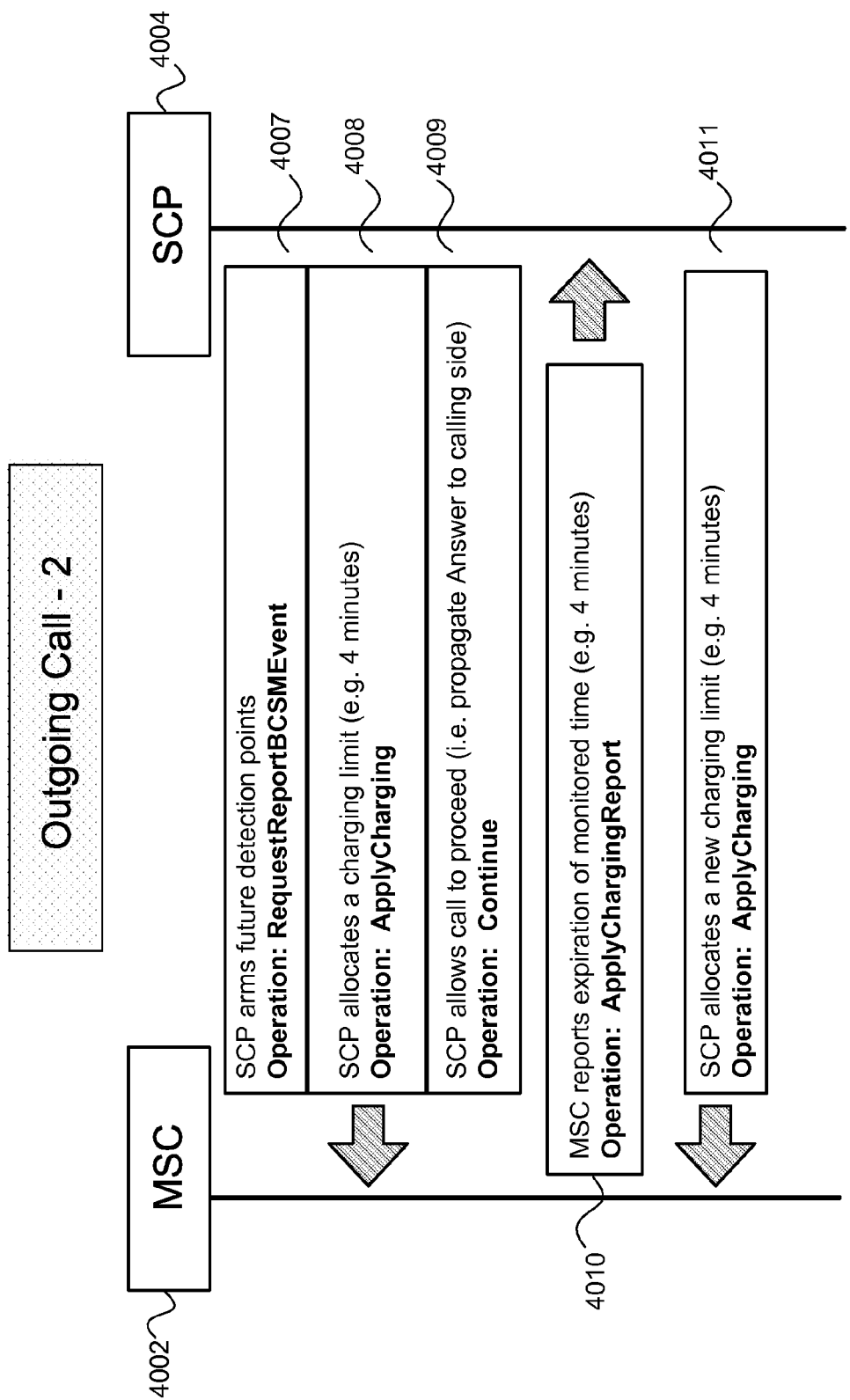
Figure 4C:
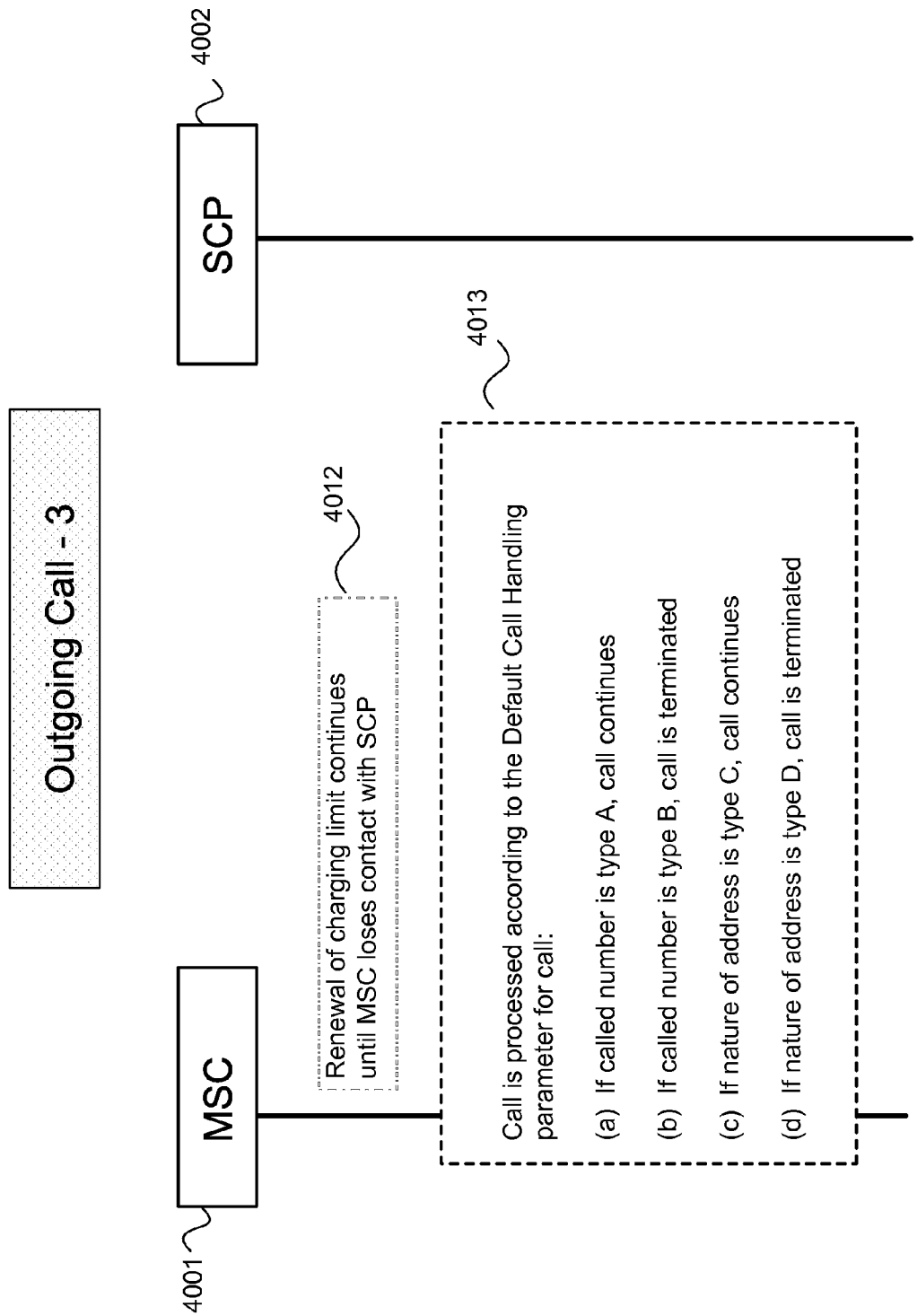

An exemplary call processing flow for an outgoing call by a prepaid mobile subscriber in accordance with one or more aspects described herein is shown in FIGS. 4A-4C. An outgoing call flow in accordance with aspects herein can involve messaging between a Home Location Register (HLR) 4001, Mobile Switching Center (MSC) 4002, a Prepaid Platform 4003 and a Service Control Point (SCP) 4004. In accordance with one or more aspects, messaging can also occur between MSC 4002 and HLR 4001, between MSC 4002 and SCP 4004, between Prepaid Platform 4003 and SCP 4004. At step 4005(*a*), an Originating Call Attempt by a prepaid mobile subscriber can be intercepted due to the presence of Originating CAMEL Subscription Information (O-CSI) in the subscriber's record in the subscriber's VLR. The caller's O-CSI can include information regarding one or more TDPs for controlling processing in the call. This information can also include a Default Call Handling parameter in a TDP for the call, for example, in DP2 "Collected Information," to control processing if communications between MSC 4002 and SCP 4004 fails. In step 4005(*b*), the MSC decides which value of Default Call Handling will control the processing of this call. In accordance with one or more aspects described herein, the Default Call Handling parameter can be set so that the MSC can "continue" or "release" the call based on characteristics of the outgoing call. For example, the Default Call Handling parameter can be set to "continue" the call if the number dialed indicates it is a local or domestic long-distance call or is a toll-free call such as for a "1-800" number or a customer care number for the mobile service provider. Alternatively, if the number dialed by the prepaid mobile subscriber begins with "011" indicating an international call, the Default Call Handling parameter can be set to instruct the MSC to "release" the call. The Default Call Handling parameter can also be set to "release" based on a Nature of Address of a dialed number, for example, to release if a Nature of Address of a dialed number indicates that the number is an international number or other high-charge number such as a "1-900" number. At step 4005(*c*) of FIG. 4A, messaging between MSC 4002, Prepaid Platform 4003, and SCP 4004 can determine, that the prepaid subscriber is eligible to complete the call because she has a high prepaid account balance, is calling from a special location, or otherwise. Once the eligibility of the prepaid subscriber is established, at step 4004(*d*), the call set up can continue. After the called party answers the call, at step 4006, via Operation: EventReportBCSM, MSC 4002 can report the answer to SCP 4004.

FIGS. 4B and 4C depict additional call processing steps according to aspects described herein. As shown in FIG. 4B, at step 4007, SCP 4004 can arm future detection points relating to the call via Operation: RequestReportBCSMEvent and can report those armed detection points to MSC 4002. In addition, in accordance with aspects described herein, SCP 4004, in conjunction with Prepaid Platform 4003 and MSC 4002, can manage control functions relating to charging a prepaid subscriber for a call. To ensure that a prepaid subscriber making an outgoing call does not exceed her prepaid account balance or otherwise become ineligible to continue the call, messaging between MSC 4002 and SCP 4004 can control call flow in segments so that the prepaid subscriber's eligibility to continue the call can be monitored. At step 4008 in FIG. 4B, SCP 4004 can allocate a charging limit time period, for example, 4 minutes, to the prepaid call, and via Operation: ApplyCharging can advise MSC 4002 of this charging limit time period and instruct MSC 4002 to monitor for its expiration. At step 4009, SCP 4004 can allow the call to proceed by instructing MSC 4002 via Operation: Continue to propagate the answer to the calling party side. After the expiration of the initial charging limit time period, for example, after the expiration of 4 minutes, at step 4010 MSC 4002 can report to SCP 4004 via Operation: ApplyChargingReport that the monitored time has expired. If the caller's prepaid account balance is sufficiently high to cover an additional period or the caller is otherwise eligible to continue the call, at step 4011, SCP 4004 can allocate a new charging limit, again, for example, 4 minutes, and via a second iteration of Operation: ApplyCharging can advise MSC 4002 of this new charging limit.

As seen in FIG. 4C, in step 4012, the monitoring and renewal of charging limits seen in steps 4008, 4010, and 4011 of FIG. 4B can continue until MSC 4002 loses contact with SCP 4004. It should be noted that the communication between MSC and SCP can be lost at any time, even before the first allocated time period has expired. As seen in step 4013, in accordance with one or more aspects described herein, after MSC 4002 loses contact with SCP 4004, the call can be processed according to the value of a Default Call Handling parameter in the caller's O-CSI, which can be set to "continue" or "release" depending on characteristics of the call, such as characteristics of the dialed number. For example, as seen in step 4013(*a*), a Default Call Handling parameter can be set to "continue" if a dialed number is type A, such as a local number for the prepaid subscriber or a "1-800" toll-free number, so that the call can be permitted to continue even without messaging between the MSC and the SCP to manage charging for the call. Alternatively, a Default Call Handling parameter can be set to "release" if a dialed number is type B, such as a number beginning with an area code indicating that the call is a long-distance call or "011" to indicate an international call, so that such a call will be released, i.e., terminated, if messaging between the MSC and SCP fails and SCP loses control of charging for the call. In accordance with aspects herein, a Default Call Handling parameter can also be set to "continue" or "release" depending on a Nature of Address for the call. For example, as seen in steps 4013(*c*) and (*d*), a Default Call Handling parameter can be set to "continue" if a Nature of Address for a call is type C, such as a "national" or "domestic" call, while a Default Call Handling parameter can be set to "release" for a call having a Nature of Address of type D, for example, an international call not requiring the use of a "011" prefix.

Figure 5A:
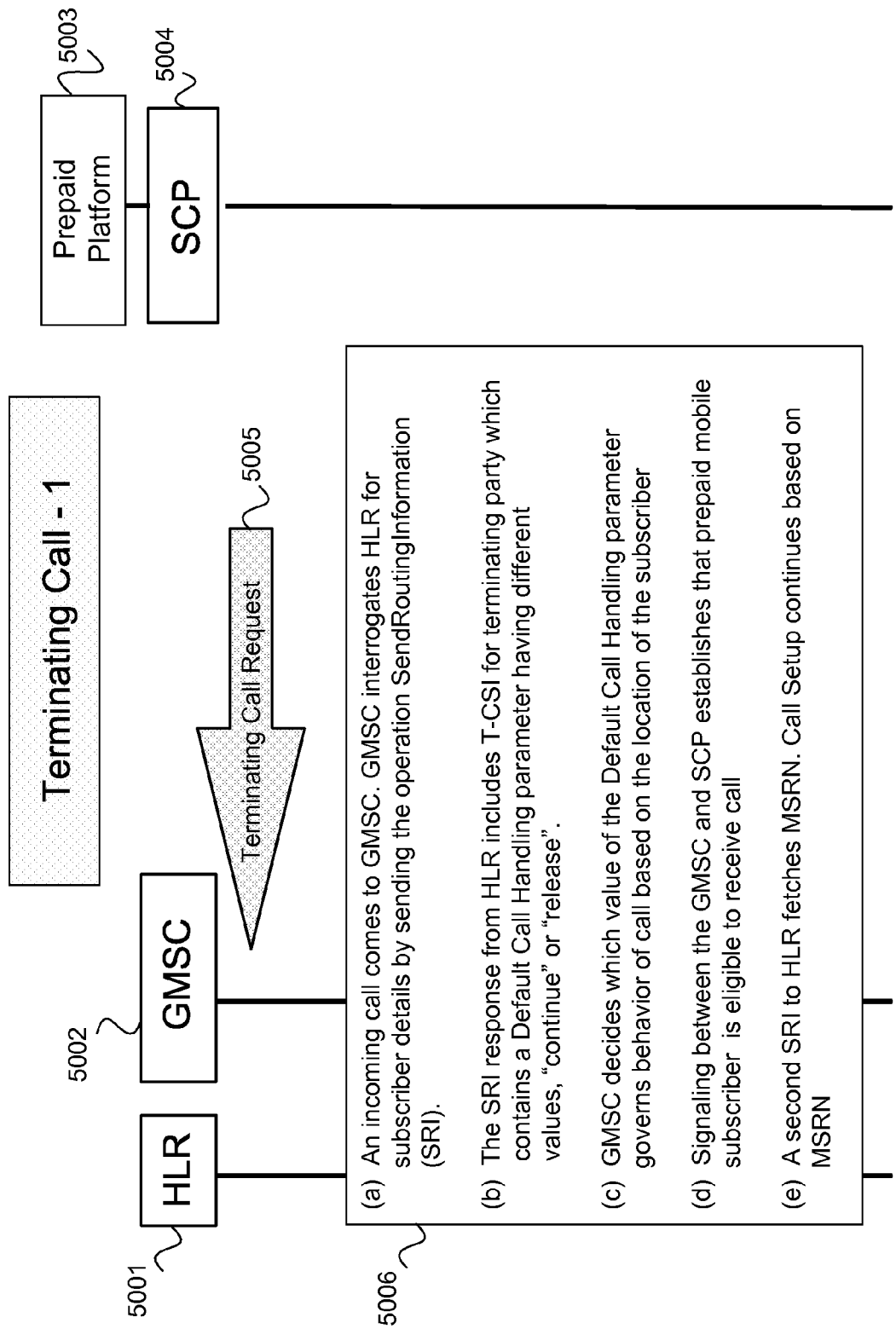
FIGS. 5A-5C depict a call flow in a CAMEL Terminating Basic Call State Model in a mobile network according to one or more aspects described herein.
Figure 5B:
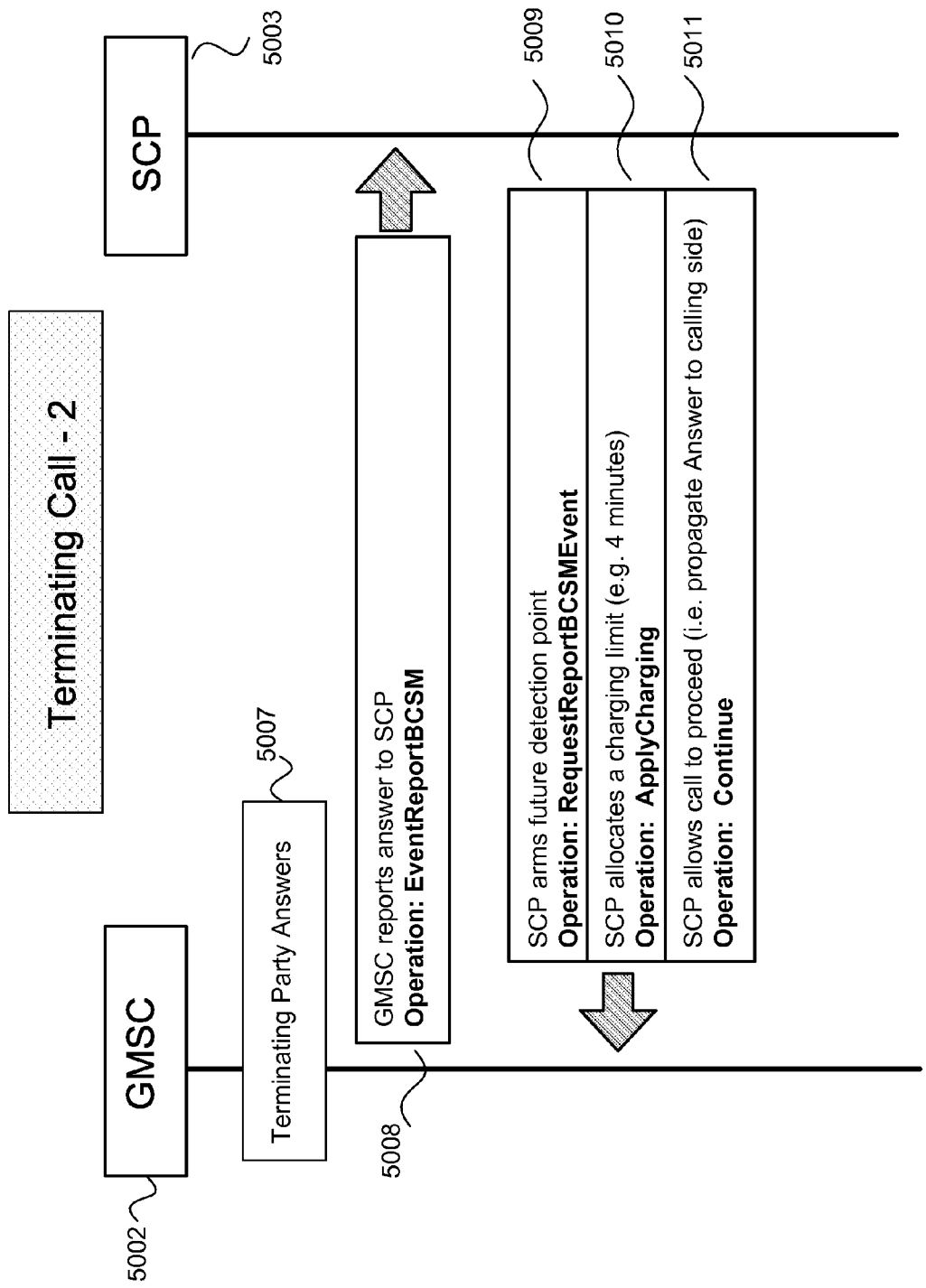
Figure 5C:
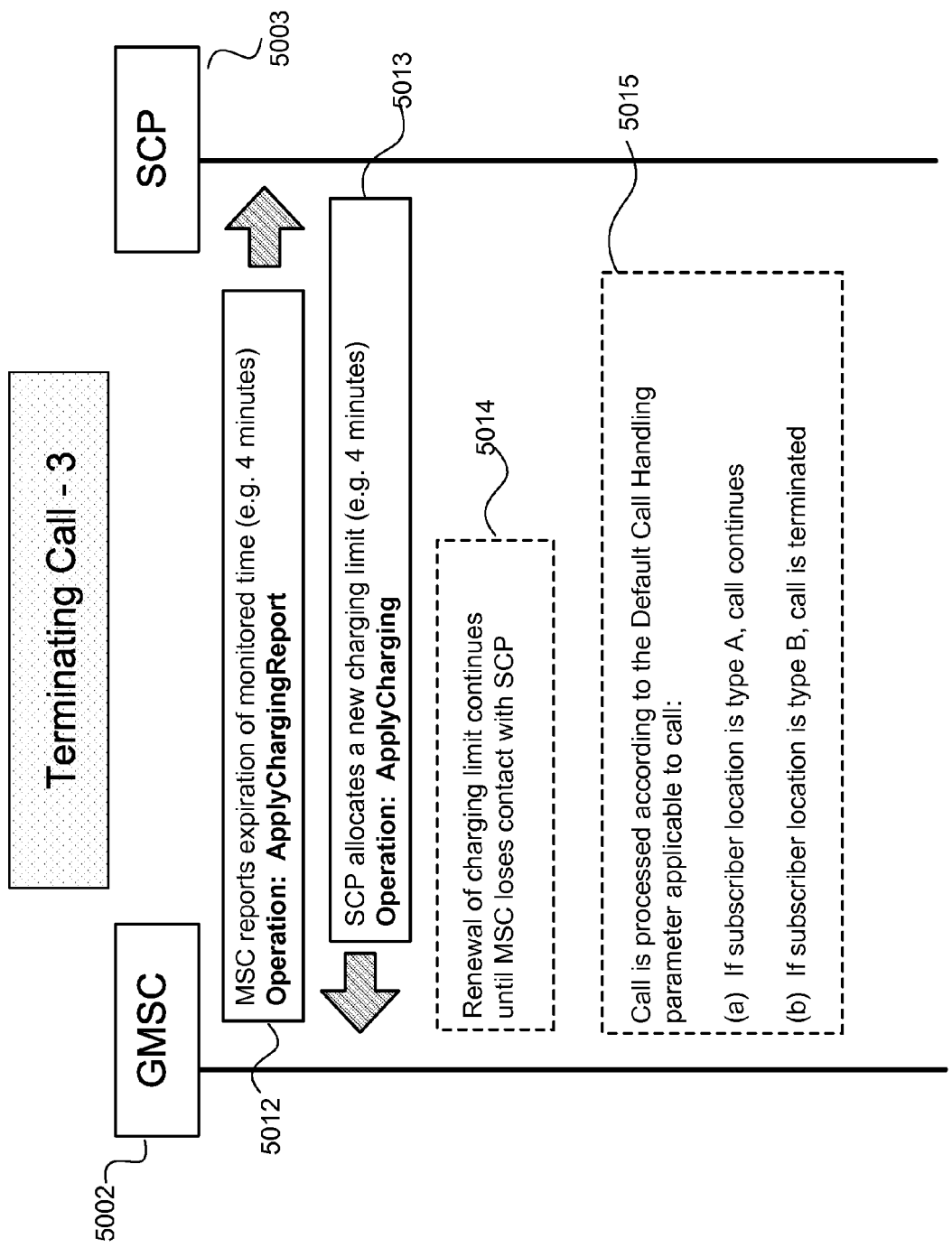

FIGS. 5A-5C depict an exemplary call processing flow for an incoming call to a prepaid mobile subscriber as a terminating party in accordance with one or more aspects described herein. In a manner similar to that for an outgoing call flow described above with respect to FIGS. 4A-4C, a call flow for a terminating call in accordance with aspect herein can involve messaging between a Home Location Register (HLR) 5001, a Gateway Mobile Switching Center (GMSC) 5002, a Prepaid Platform 5003 and a Service Control Point (SCP) 5004. In accordance with one or more aspects, messaging can also occur between GMSC 5002 and HLR 5001, between GMSC and SCP and between Prepaid Platform 5003 and SCP 5004. At step 5005, a Terminating Call Request, which is an incoming call to a prepaid mobile subscriber in a CAMEL network, is directed to GMSC 5002. At step 5006 (*a*), GMSC 5002 sends a Send Routing Information to HLR 5001 to obtain information regarding the subscriber for use in processing the call. At step 5006(*b*) GMSC 5002 receives the response of the Send Routing Information (SRI) request from HLR 5001 which includes the subscriber's T-CSI. Because there is Terminating CAMEL Subscription Information (T-CSI) in the subscriber's record in the subscriber's HLR, the Terminating Call Request is intercepted and is processed according to the information in the T-CSI. The T-CSI can contain information regarding one or more TDPs for controlling processing in the call. This information can also include a Default Call Handling parameter in a TDP for the call, for example, in DP12 "Terminating Attempt Authorized," to control call processing if communications between GMSC 3002 and SCP 3004 fails. In accordance with one or more aspects described herein, the Default Call Handling parameter can be set so that the GMSC can "continue" or "release" the call based on, for example, a location of the terminating subscriber. For example, the Default Call Handling parameter can be set to "continue" the call if the terminating subscriber is within her own home network or is within another specified network. Alternatively, the Default Call Handling parameter can be set to "release" the call if the mobile terminating subscriber is outside her home network or if she or the calling party is outside the country. As seen in step 5006(*c*), in accordance with aspects herein and as described above, GMSC can decide which value of a Default Call Handling parameter will control this call based on a characteristic of the call, such as a location of a terminating mobile subscriber. The default call handling parameter can also be defined to resolve conflicts between characteristics of the call. For example, one characteristic of an incoming call such as a location of an originator of a call can cause the value of the parameter to be set to "continue" and another characteristic such as a location of a terminating mobile subscriber cause the value of the parameter to be set to "release," and the default call handling parameter can be defined to choose one of "continue" or "release" in the case of such conflicts. At step 5005(*d*) of FIG. 5A, messaging between GMSC 5002, Prepaid Platform 5003, and SCP 5004 can determine that the prepaid caller is eligible to complete the call as a terminating party. At step 5006(*e*) the call setup continues, and GMSC 5002 can send a second SRI request to HLR 5001 to fetch a temporary routable number known as Mobile Station Routing Number (MSRN) so that GMSC 5002 can route the call to the recipient.

In FIGS. 5B and 5C, additional call processing steps in accordance with one or more aspects described herein are shown. At step 5007, the terminating party, i.e., the prepaid subscriber in a CAMEL network, answers the incoming call, and at step 5008, via Operation: EventReportBCSM, GMSC 5002 can report to SCP 5004 that the call has been answered. At step 5009, SCP 5004 can arm future detection points relating to the call by sending Operation: RequestReportBC-SMEvent to GMSC 5002. In addition, in a manner similar to that described above for an outgoing call in accordance with aspects herein, SCP 5004, in conjunction with Prepaid Platform 5003 and GMSC 5002, can manage control functions relating to charging a prepaid subscriber for a call. In a manner similar to that for an outgoing call as described above, to ensure that a prepaid subscriber receiving an incoming call does not exceed her prepaid account balance, messaging between GMSC 5002 and SCP 5004 can control call flow in segments so that the prepaid subscriber's eligibility to continue the call can be periodically monitored. Thus, at step 5010 in FIG. 5B, SCP 5004 can allocate a charging limit time period, for example, 4 minutes, to the prepaid call, and via Operation: ApplyCharging can advise GMSC 5002 of this charging limit time period and instruct GMSC 5002 to monitor for its expiration. At step 5011, SCP 5004 can allow the call to proceed by instructing GMSC 5002 via Operation: Continue to propagate the Answer event to the calling party side.

After the expiration of the initial charging limit time, that is, after the expiration of 4 minutes in the present example, at step 5012 in FIG. 5C, GMSC 5002 can report to SCP 5004 via Operation: ApplyChargingReport that the monitored time has expired. If the prepaid subscriber's prepaid account balance is sufficiently high to cover an additional period as a terminating party to the call or the prepaid subscriber is otherwise eligible to continue, at step 5013, SCP 5004 can allocate a new charging limit, again, for example, 4 minutes, and via a second iteration of Operation: ApplyCharging can advise GMSC 5002 of this new charging limit. As seen in step 5014, the monitoring and renewal of charging limits seen in steps 5010, 5012, and 5013 can continue until GMSC 5002 loses contact with SCP 5004. As with the case of an outgoing call, it should be noted that loss of communication between GMSC 5002 and SCP 5004 can occur at any time during the call, even before the expiration of the first charging period allocated for the call. As seen in step 5014, in accordance with one or more aspects described herein, upon the occurrence of such an event, the remainder of the call can be processed according to the value of a Default Call Handling parameter depending on a characteristic of the call such as a location of a mobile subscriber. For example, as seen in step 5015(*a*), a Default Call Handling parameter can be set to "continue" if a location of the terminating mobile subscriber is type A, such as within her own network or within a specified roaming network, so that the call can be permitted to continue even without messaging between the MSC and the SCP to manage charging for the call. Alternatively, as seen in step 5015(*b*), a Default Call Handling parameter can be set to "release" the call if the terminating mobile subscriber's location is type B, for example, she is outside her home network or outside the country.

Thus, an outgoing call processed in accordance with aspects described herein can be released or allowed to continue based on characteristics of the call such as the dialed number of a nature of address. Similarly, an incoming call processed in accordance with aspects herein can be released or allowed to continue based on characteristics of the incoming call such as a location of a terminating mobile subscriber. In both cases, inconvenience to the prepaid subscriber can be minimized while also minimizing the risk to the network of expensive uncharged calls.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

I claim:

1. A method for processing a prepaid call in a telecommunications network including messaging between a Mobile Switching Center or Gateway Mobile Switching Center ("MSC/GMSC") and a Service Control Point ("SCP"), comprising:

receiving a signal associated with a prepaid call including information of a characteristic of the prepaid call;

determining whether the characteristic of the call matches established criteria for continuation of the call, in the event of a failure of messaging between the MSC/GMSC and the SCP;

continuing the call despite the failure of messaging when the characteristic of the call matches the established criteria; and one of releasing and continuing the call according to a default continue/release call handling parameter when the characteristic of the call does not match the established criteria.

2. The method for processing a prepaid call according to claim 1, wherein the criteria include a characteristic of a dialed number associated with an outgoing prepaid call.

3. The method for processing a prepaid call according to claim 1, wherein the criteria include a characteristic of a nature of an address associated with the outgoing call.

4. The method for processing a prepaid call according to claim 1, wherein the call is an outgoing call.

5. The method for processing a prepaid call according to claim 1, wherein the call is an incoming call.

6. The method for processing a prepaid call according to claim 1, wherein the criteria include at least one of a location of an originator of the call, the location of a terminating mobile subscriber, international call designation, domestic call designation, and a nature of service provided by a dialed number.

7. A system for processing a prepaid call in a telecommunications network including messaging between a Mobile Switching Center or Gateway Mobile Switching Center ("MSC/GMSC") and a Service Control Point ("SCP"), comprising:
a first receiver configured to receive information regarding a characteristic of the prepaid call; and
a processor configured to compare the characteristic of the prepaid call to established criteria for selective continuation of the call in the event of a failure of messaging between the MSC/GMSC and the SCP;
wherein the processor is further configured to selectively control continuation of the call, upon the failure of messaging, based on correlation of the characteristic of the prepaid call with the established criteria, and to handle the prepaid call according to a default continue/release call handling parameter if the characteristic of the prepaid call does not match the established criteria.

8. The system for processing a prepaid call according to claim 7, wherein the criteria includes a characteristic of a dialed number.

9. The system for processing a prepaid call according to claim 7, wherein the criteria includes a nature of an address associated with the call.

10. The system for processing a prepaid call according to claim 7, wherein the call is an outgoing call.

11. The system for processing a prepaid call according to claim 7, wherein the call is an incoming call.

12. The system for processing a prepaid call according to claim 7, wherein the criteria include at least one of a location of an originator of the call, the location of a terminating mobile subscriber, international call designation, domestic call designation, and a nature of service provided by the dialed number.

13. A method for provisioning a subscriber with a value of a continue/release call instruction associated with a detection point for a call with messaging between a Mobile Switching Center or Gateway Mobile Switching Center ("MSC/GMSC") and a Service Control Point ("SCP"), comprising:
receiving information regarding a first detection point associated with the call;
receiving information regarding a default call handling parameter associated with the first detection point;
receiving information regarding a characteristic of the call; and
establishing a continue/release call instruction superseding the default call handling parameter based on correlation of the characteristic of the call with criteria for continuation of the call in the event of a failure of messaging between the MSC/GMSC and the SCP.

* * * * *